US009264200B2

(12) United States Patent
Noh et al.

(10) Patent No.: US 9,264,200 B2
(45) Date of Patent: *Feb. 16, 2016

(54) METHOD AND APPARATUS FOR TRANSMITTING A REFERENCE SIGNAL IN A MULTI-ANTENNA SYSTEM

(71) Applicant: LG ELECTRONICS INC., Seoul (KR)

(72) Inventors: Min Seok Noh, Anyang-si (KR); Hyun Soo Ko, Anyang-si (KR); Seung Hee Han, Anyang-si (KR); Jae Hoon Chung, Anyang-si (KR); Moon Il Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/609,125

(22) Filed: Jan. 29, 2015

(65) Prior Publication Data

US 2015/0139165 A1 May 21, 2015

Related U.S. Application Data

(63) Continuation of application No. 13/496,392, filed as application No. PCT/KR2010/006361 on Sep. 16, 2010, now Pat. No. 8,982,834.

(60) Provisional application No. 61/242,810, filed on Sep. 16, 2009, provisional application No. 61/378,953, filed on Sep. 1, 2010.

(30) Foreign Application Priority Data

Sep. 16, 2010 (KR) .................. 10-2010-0091229

(51) Int. Cl.
*H04W 4/00* (2009.01)
*H04L 5/00* (2006.01)
(Continued)

(52) U.S. Cl.
CPC ............ *H04L 5/0053* (2013.01); *H04L 5/0023* (2013.01); *H04L 5/0048* (2013.01);
(Continued)

(58) Field of Classification Search
None
See application file for complete search history.

(56) References Cited

U.S. PATENT DOCUMENTS 8,982,834 B2 * 3/2015 Noh et al. ............... 370/330
2008/0273610 A1 11/2008 Malladi et al.
(Continued)

FOREIGN PATENT DOCUMENTS

JP          2009-4926 A    1/2009
JP          2009-111780 A  5/2009
(Continued)

OTHER PUBLICATIONS

LG Electronics Inc, "Consideration on DMRS design for UL SU-MIMO in LTE-A", Discussion, 3GPP TSG RAN WG1 Meeting #57bis, Los Angeles, CA, USA, Jun. 29-Jul. 3, 2009, R1-092514, pp. 1-4.
(Continued)

*Primary Examiner* — Minh-Trang Nguyen
(74) *Attorney, Agent, or Firm* — Birch, Stewart, Kolasch & Birch, LLP

(57) ABSTRACT

A method is described for transmitting, by a user equipment (UE), a demodulation reference signal (DMRS) for a physical uplink shared channel (PUSCH) in a wireless communication system. A cyclic shift field is received through a physical downlink control channel (PDCCH) from a base station. The cyclic shift field indicates first, second, third and fourth cyclic shifts, first orthogonal cover code (OCC) and a second OCC. A first DMRS sequences is generated by using the first cyclic shift and the first OCC. A second DMRS sequence is generated by using the second cyclic shift and the first OCC. A third DMRS sequence is generated by using the third cyclic shift and the second OCC. A fourth DMRS sequence is generated by using the fourth cyclic shift and the second OCC. The first, second, third and fourth DMRS sequences are transmitted to the base station.

18 Claims, 14 Drawing Sheets

(51) Int. Cl.
  *H04L 27/26* (2006.01)
  *H04W 72/04* (2009.01)
  *H04B 7/06* (2006.01)

(52) U.S. Cl.
  CPC ........ *H04L27/2605* (2013.01); *H04L 27/2607* (2013.01); *H04W 72/0406* (2013.01); *H04W 72/0466* (2013.01); *H04B 7/0613* (2013.01)

(56) References Cited

U.S. PATENT DOCUMENTS

| | | |
|---|---|---|
| 2008/0318608 A1 | 12/2008 | Inoue et al. |
| 2009/0019337 A1 | 1/2009 | Pi et al. |
| 2009/0220023 A1 | 9/2009 | Ihm et al. |
| 2009/0303929 A1 | 12/2009 | Yamamoto et al. |
| 2010/0309857 A1 | 12/2010 | Kawamura et al. |
| 2011/0243066 A1 | 10/2011 | Nayeb Nazar et al. |
| 2013/0308588 A1 | 11/2013 | Jongren et al. |

FOREIGN PATENT DOCUMENTS

| | | |
|---|---|---|
| KR | 10-2007-0093787 A | 9/2007 |
| KR | 10-2009-0006795 A | 1/2009 |
| KR | 10-2009-0053835 A | 5/2009 |
| WO | WO 2008/053930 A1 | 5/2008 |
| WO | WO 2008/132073 A1 | 11/2008 |

OTHER PUBLICATIONS

Motorola, "PHICH Mapping for UL SU-MIMO," 3GPP TSG RAN WG1 Meeting #61bis, Jun. 28-Jul. 3, 2010, pp. 1-4, R1-103944.
Panasonic, "Views on UL DM-RS", 3GPP TSG RAN WG1 #59, R1-094508, Nov. 9-13, 2009, 4 pages.
Qualcomm Europe, "Flexible Data and Reference Multiplexing for LTE-Advanced Uplink", 3GPP TSG RAN WG1 #55bis, R1-090364, Jan. 12-16, 2009, 7 pages provided.
Texas Instruments, "Discussion on UL DM RS for SU—MIMO", Discussion and Decision, 3GPP TSG RAN WG1 #57, San Francisco, USA, May 4-8, 2009, R1-091843, pp. 1-3.

* cited by examiner

FIG. 7
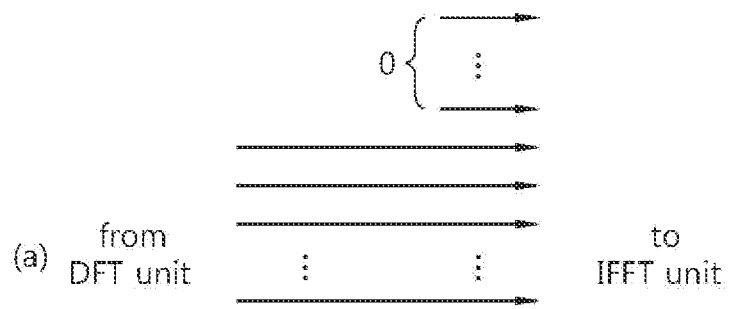
(a) from DFT unit — to IFFT unit
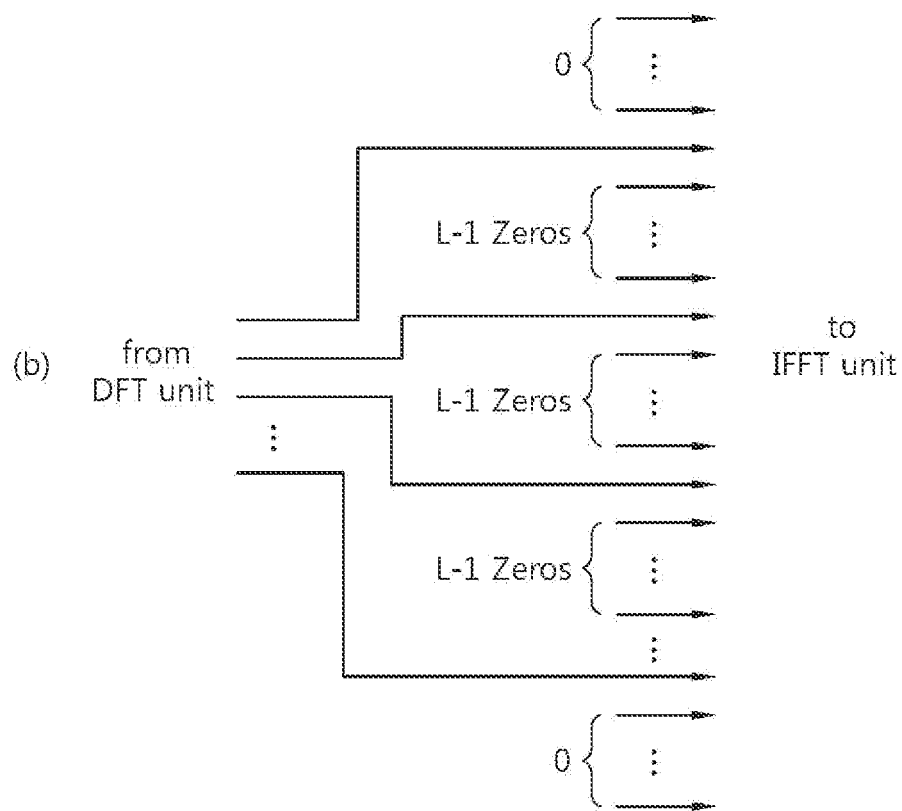
(b) from DFT unit — to IFFT unit FIG. 9
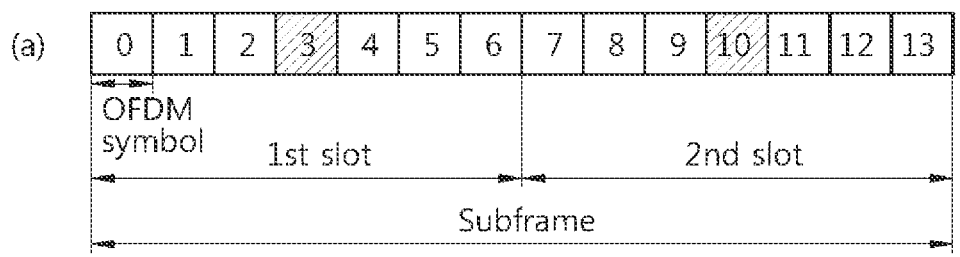
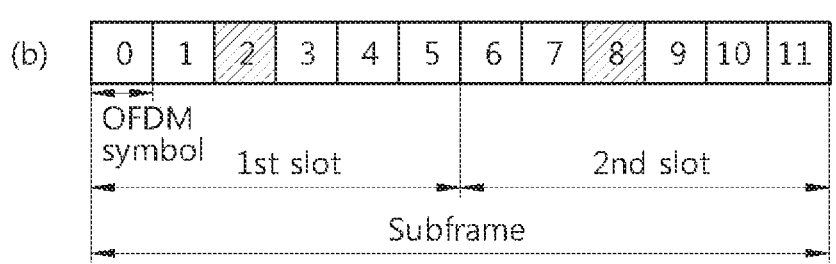

METHOD AND APPARATUS FOR TRANSMITTING A REFERENCE SIGNAL IN A MULTI-ANTENNA SYSTEM

CROSS-REFERENCE TO RELATED APPLICATIONS

This application is a continuation of co-pending U.S. patent application Ser. No. 13/496,392 filed on Jun. 21, 2012, which is the National Phase of PCT/KR2010/006361 filed on Sep. 16, 2010, which claims priority under 35 U.S.C. §119(e) to U.S. Provisional Application Nos. 61/242,810 filed on Sep. 16, 2009 and 61/378,953 filed on Sep. 1, 2010, and under 35 U.S.C. §119(a) to Patent Application No. 10-2010-0091229 filed in the Republic of Korea on Sep. 16, 2010, all of which are hereby expressly incorporated by reference into the present application.

BACKGROUND OF THE INVENTION

1. Technical Field

The present invention relates to wireless communications, and more particularly, to a method and apparatus for transmitting a reference signal in a multi-antenna system.

2. Background Art

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

MIMO technology can be used to improve the efficiency of data transmission and reception using multiple transmission antennas and multiple reception antennas. MIMO technology may include a space frequency block code (SFBC), a space time block code (STBC), a cyclic delay diversity (CDD), a frequency switched transmit diversity (FSTD), a time switched transmit diversity (TSTD), a precoding vector switching (PVS), spatial multiplexing (SM) for implementing diversity. An MIMO channel matrix according to the number of reception antennas and the number of transmission antennas can be decomposed into a number of independent channels. Each of the independent channels is called a layer or stream. The number of layers is called a rank.

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a reference signal (RS) which is known to both a transmitter and a receiver can be used.

A subcarrier used to transmit the reference signal is referred to as a reference signal subcarrier, and a subcarrier used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in y=h·p+n. Here, since the receiver already knows the reference signal p, it can estimate a channel information value ĥ using Equation 1 in the case in which a least square (LS) method is used.

$$\hat{h} = y/p = h + n/p = h + \hat{n} \qquad \text{[Equation 1]}$$

The accuracy of the channel estimation value ĥ estimated using the reference signal p is determined by the value n̂. To accurately estimate the value h, the value n̂ must converge on 0. To this end, the influence of the value n̂ has to be minimized by estimating a channel using a large number of reference signals. A variety of algorithms for a better channel estimation performance may exist.

Meanwhile, a reference signal transmission method supporting a MIMO system using a plurality of antennas in uplink transmission and its related method of allocating a cyclic shift value of a reference signal sequence have not been proposed up to now in the 3GPP LTE system. Therefore, there is a need for a reference signal transmission method which guarantees channel estimation capability in the MIMO system.

SUMMARY OF THE INVENTION

The present invention provides a method and apparatus for transmitting a reference signal in a multi-antenna system.

In an aspect, a method for transmitting a reference signal in a multi-antenna system is provided. The method includes generating a plurality of reference signal sequences in which different cyclic shift values are allocated respectively to a plurality of layers, generating a single carrier-frequency division multiple access (SC-FDMA) to which the plurality of reference signal sequences are mapped, and transmitting the SC-FDMA symbol to a base station through a plurality of antennas, wherein each of the reference signal sequences is multiplied by either +1 or −1 for each of the layers in accordance with an orthogonal covering code (OCC) index corresponding to a cyclic shift field in a downlink control information (DCI) format transmitted through a physical downlink control channel (PDCCH). The reference signal sequences may be mapped respectively to two slots in a subframe, and a reference signal sequence mapped to a 2nd slot of the two slots may be multiplied by either +1 or −1 in accordance with the OCC index. The OCC index may be either 0 or 1. A reference signal sequence mapped to a 2nd slot of the two slots in a subframe may be multiplied by +1 when the OCC index is 0, and the reference signal sequence mapped to the 2nd slot may be multiplied by −1 when the OCC index is 1. Each of the reference signal sequences may be transmitted in a 4th SC-FDMA symbol in each slot in case of a normal cyclic prefix (CP), and may be transmitted in a 3rd SC-FDMA symbol in each slot in case of an extended CP. The cyclic shift filed may have a length of 3 bits. The number of layers may be any one of values 2 to 4. A cyclic shift value allocated to each of the layers may be indicated by the cyclic shift field. A 1st cyclic shift value allocated to a reference signal sequence of a 1st layer and a 2nd cyclic shift value allocated to a reference signal sequence of a 2nd layer among the reference signal sequences for the plurality of layers may have a maximum interval. The same OCC index may be applied to the reference signal sequence of the 1st layer and the reference signal sequence of the 2nd layer.

In another aspect, an apparatus for transmitting a reference signal is provided. The apparatus includes a reference signal generator for generating a plurality of reference signal sequences in which different cyclic shift values are allocated respectively to a plurality of layers, an SC-FDMA symbol generator for generating a single carrier-frequency division multiple access (SC-FDMA) to which the plurality of reference signal sequences are mapped, and a radio frequency (RF) unit for transmitting the SC-FDMA symbol to a base station through a plurality of antennas, wherein each of the reference signal sequences is multiplied by either +1 or −1 in accordance with an orthogonal covering code (OCC) index corresponding to a cyclic shift field in a downlink control information (DCI) format transmitted through a physical downlink control channel (PDCCH) for each of the layers. The reference signal sequences may be mapped respectively to two slots in a subframe, and A reference signal sequence mapped to a 2nd slot of the two slots may be multiplied by either +1 or −1 in accordance with the OCC index. The OCC index may be either 0 or 1. A reference signal sequence mapped to a 2nd slot of the two slots in a subframe may be multiplied by +1 when the OCC index is 0, and The reference signal sequence mapped to the 2nd slot may be multiplied by −1 when the OCC index is 1. A cyclic shift value allocated to each of the layers may be indicated by the cyclic shift field.

Channel estimation performance can be guaranteed by effectively allocating a cyclic shift value for a reference signal sequence and by applying an orthogonal covering code (OCC).

BRIEF DESCRIPTION OF THE DRAWINGS

FIG. 7 shows an example of a scheme in which the subcarrier mapper maps the complex-valued symbols to the respective subcarriers of the frequency domain.
FIG. 9 shows examples of a subframe through which a reference signal is transmitted.

DETAILED DESCRIPTION OF THE INVENTION

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as IEEE (Institute of Electrical and Electronics Engineers) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LET-A will be largely described, but the technical concept of the present invention is not meant to be limited thereto.

Figure 1:
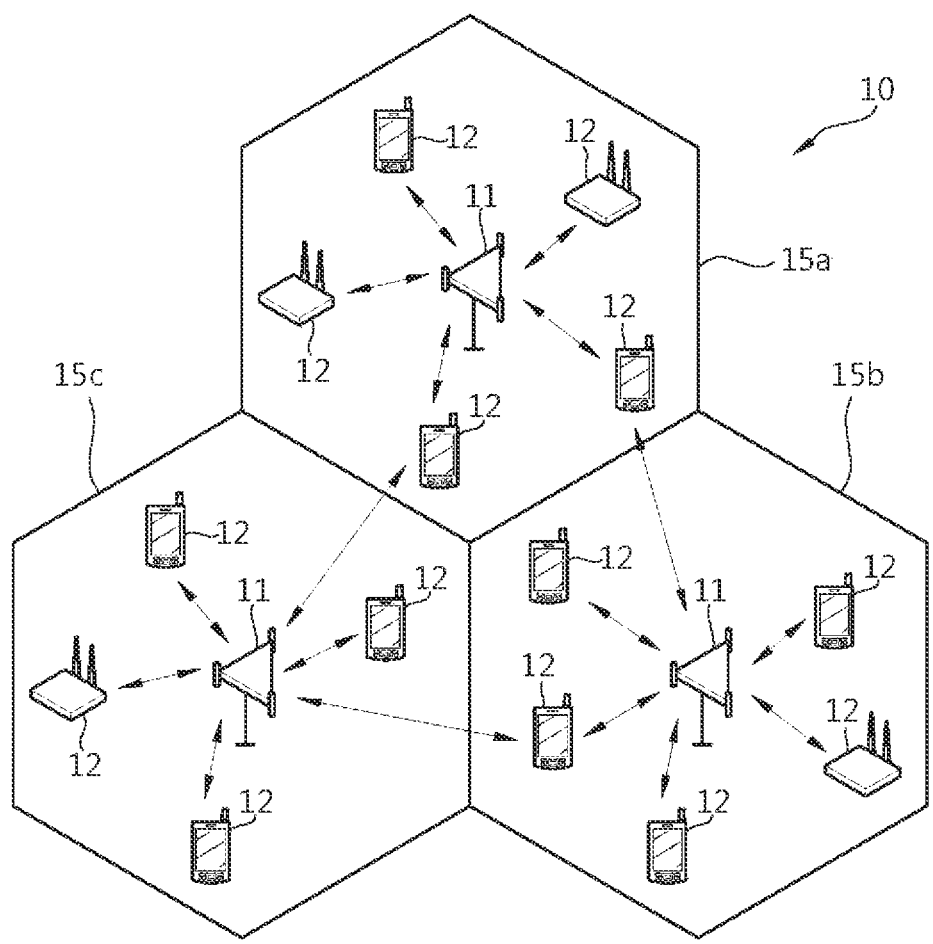
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15*c* (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, or handheld device. The BS 11 generally refers to a fixed station that communicates with the UE 12 and may be called by other names such as evolved Node-B (eNB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas.

Hereinafter, a transmission antenna refers to a physical or logical antenna used for transmitting a signal or a stream, and a reception antenna refers to a physical or logical antenna used for receiving a signal or a stream.

Figure 2:
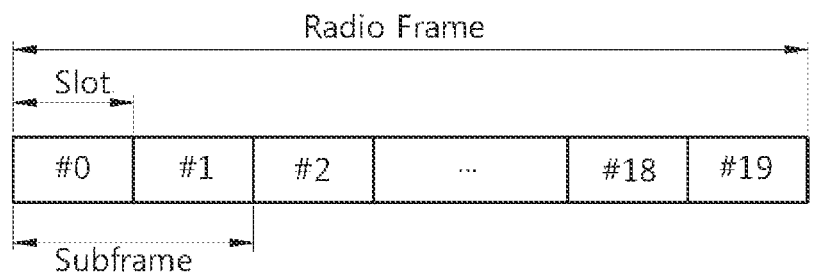
FIG. 2 shows the structure of a radio frame in 3 GPP LTE.

FIG. 2 shows the structure of a radio frame in 3GPP LTE. It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03).

Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of OFDM (Orthogonal Frequency Division Multiplexing) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

Figure 3:
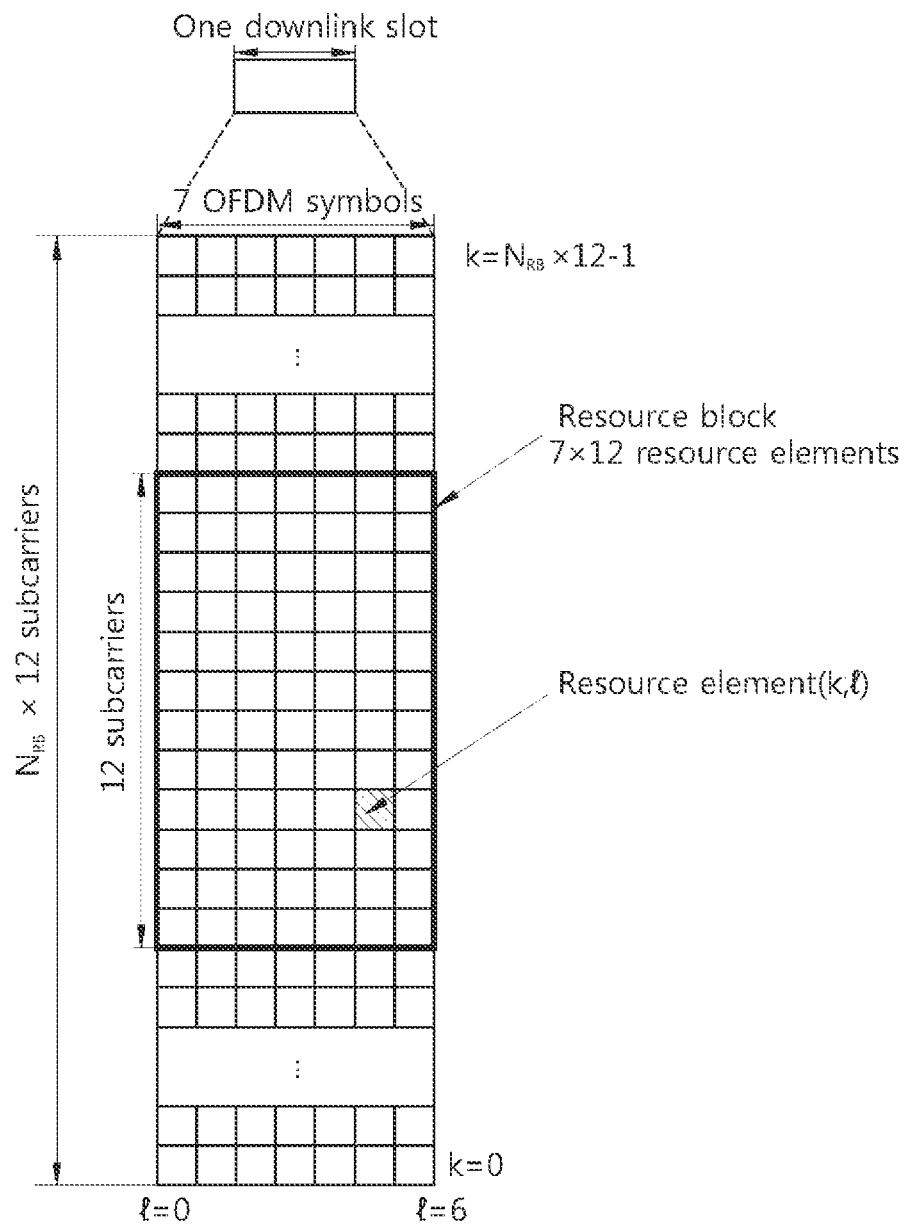
FIG. 3 shows an example of a resource grid of a single downlink slot.

FIG. 3 shows an example of a resource grid of a single downlink slot.

A downlink slot includes a plurality of OFDM symbols in the time domain and NRB number of resource blocks (RBs) in the frequency domain. The NRB number of resource blocks included in the downlink slot is dependent upon a downlink transmission bandwidth set in a cell. For example, in an LTE system, NRB may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . , NRB×12-1) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
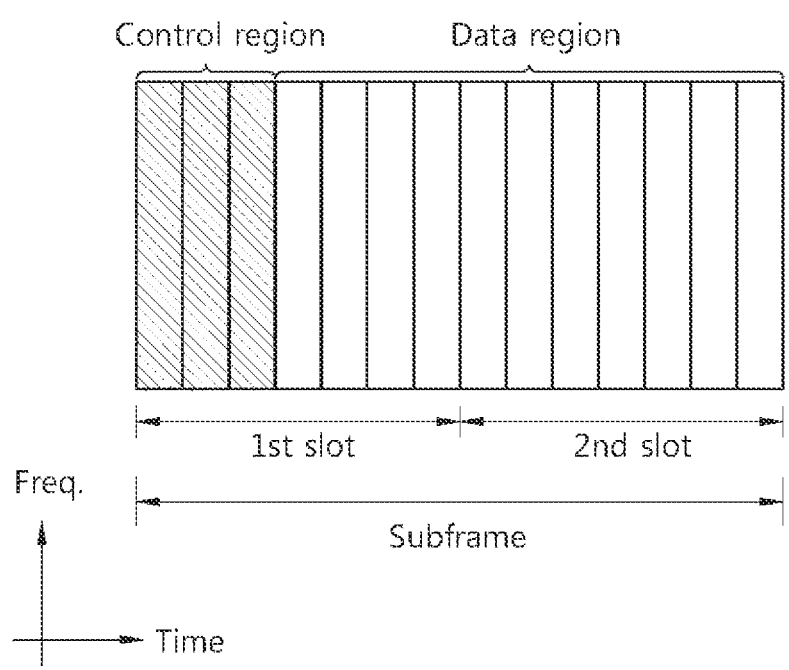
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 Mhz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCD corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
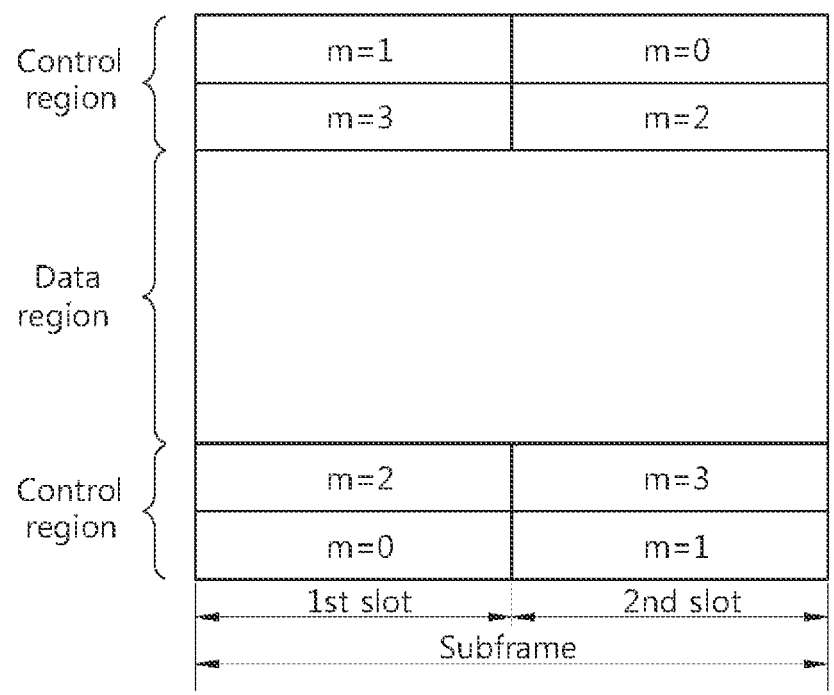
FIG. 5 shows the structure of an uplink subframe.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. The user equipment does not transmit the PUCCH and the PUSCH simultaneously to maintain a single carrier property.

The PUCCH with respect to a UE is allocated by a pair of resource blocks in a subframe. The resource blocks belonging to the pair of resource blocks (RBs) occupy different subcarriers in first and second slots, respectively. The frequency occupied by the RBs belonging to the pair of RBs is changed based on a slot boundary. This is said that the pair of RBs allocated to the PUCCH are frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, an scheduling request (SR), and the like.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

Figure 6:
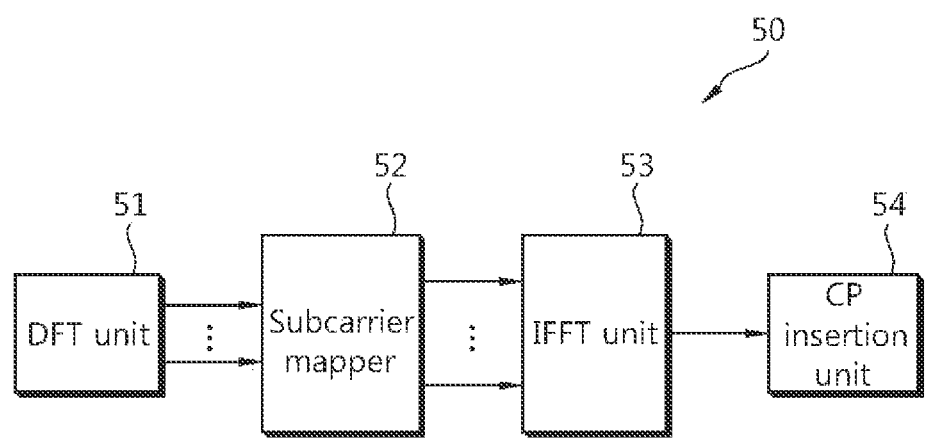
FIG. 6 shows an example of the structure of a transmitter in an SC-FDMA system.

FIG. 6 shows an example of the structure of a transmitter in an SC-FDMA system.

Referring to FIG. 6, the transmitter 50 includes a discrete Fourier transform (DFT) unit 51, a subcarrier mapper 52, an inverse fast Fourier transform (IFFT) unit 53, and a cyclic prefix (CP) insertion unit 54. The transmitter 50 may include a scramble unit (not shown), a modulation mapper (not shown), a layer mapper (not shown), and a layer permutator (not shown), which may be placed in front of the DFT unit 51.

The DFT unit 51 outputs complex-valued symbols by performing DFT on input symbols. For example, when Ntx symbols are input (where Ntx is a natural number), a DFT size is Ntx. The DFT unit 51 may be called a transform precoder. The subcarrier mapper 52 maps the complex-valued symbols to the respective subcarriers of the frequency domain. The complex-valued symbols may be mapped to resource elements corresponding to a resource block allocated for data transmission. The subcarrier mapper 52 may be called a resource element mapper. The IFFT unit 53 outputs a baseband signal for data (that is, a time domain signal) by performing IFFT on the input symbols. The CP insertion unit 54 copies some of the rear part of the baseband signal for data and inserts the copied parts into the former part of the baseband signal for data. Orthogonality may be maintained even in a multi-path channel because inter-symbol interference (ISI) and inter-carrier interference (ICI) are prevented through CP insertion.

FIG. 7 shows an example of a scheme in which the subcarrier mapper maps the complex-valued symbols to the respective subcarriers of the frequency domain. Referring to FIG. 7(a), the subcarrier mapper maps the complex-valued symbols, outputted from the DFT unit, to subcarriers contiguous to each other in the frequency domain. '0' is inserted into subcarriers to which the complex-valued symbols are not mapped. This is called localized mapping. In a 3GPP LTE system, a localized mapping scheme is used. Referring to FIG. 7(b), the subcarrier mapper inserts an (L−1) number of '0' every two contiguous complex-valued symbols which are outputted from the DFT unit (L is a natural number). That is, the complex-valued symbols outputted from the DFT unit are mapped to subcarriers distributed at equal intervals in the frequency domain. This is called distributed mapping. If the subcarrier mapper uses the localized mapping scheme as in FIG. 7(a) or the distributed mapping scheme as in FIG. 7(b), a single carrier characteristic is maintained.

Figure 8:
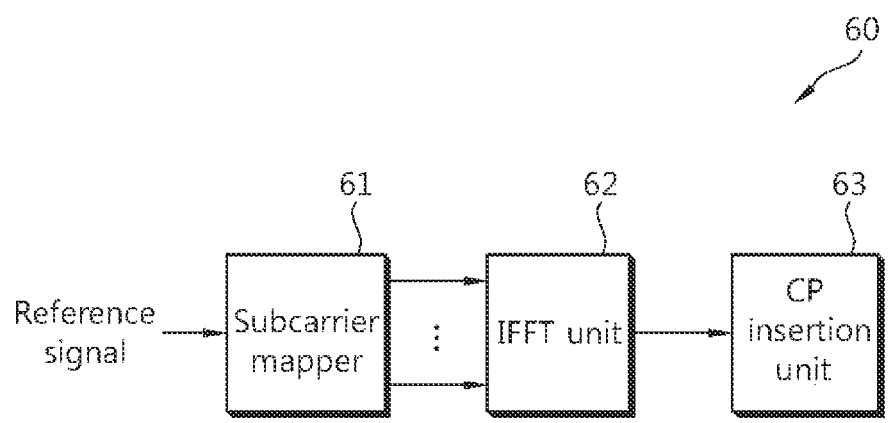
FIG. 8 shows an example of the structure of a reference signal transmitter for demodulation.

FIG. 8 shows an example of the structure of a reference signal transmitter for demodulation.

Referring to FIG. 8 the reference signal transmitter 60 includes a subcarrier mapper 61, an IFFT unit 62, and a CP insertion unit 63. Unlike the transmitter 50 of FIG. 6, in the reference signal transmitter 60, a reference signal is directly generated in the frequency domain without passing through the DFT unit 51 and then mapped to subcarriers through the subcarrier mapper 61. Here, the subcarrier mapper may map the reference signal to the subcarriers using the localized mapping scheme of FIG. 7(a).

FIG. 9 shows examples of a subframe through which a reference signal is transmitted. The structure of the subframe in FIG. 9(a) shows a case of a normal CP. The subframe includes a first slot and a second slot. Each of the first slot and the second slot includes 7 OFDM symbols. The 14 OFDM symbols within the subframe are assigned respective symbol indices 0 to 13. A reference signal may be transmitted through the OFDM symbols having the symbol indices 3 and 10. Data may be transmitted through the remaining OFDM symbols other than the OFDM symbols through which the reference signal is transmitted. The structure of a subframe in FIG. 9(b) shows a case of an extended CP. The subframe includes a first slot and a second slot. Each of the first slot and the second slot includes 6 OFDM symbols. The 12 OFDM symbols within the subframe are assigned symbol indices 0 to 11. A reference signal is transmitted through the OFDM symbols having the symbol indices 2 and 8. Data is transmitted through the remaining OFDM symbols other than the OFDM symbols through which the reference signal is transmitted.

Although not shown in FIG. 9, a sounding reference signal (SRS) may be transmitted through the OFDM symbols within the subframe. The SRS is a reference signal for UL scheduling which is transmitted from a UE to a BS. The BS estimates a UL channel through the received SRS and uses the estimated UL channel in UL scheduling.

A clustered DFT-s OFDM transmission scheme is a modification of the existing SC-FDMA transmission scheme and is a method of dividing data symbols, subjected to a precoder, into a plurality of subblocks, separating the subblocks, and mapping the subblocks in the frequency domain.

Figure 10:
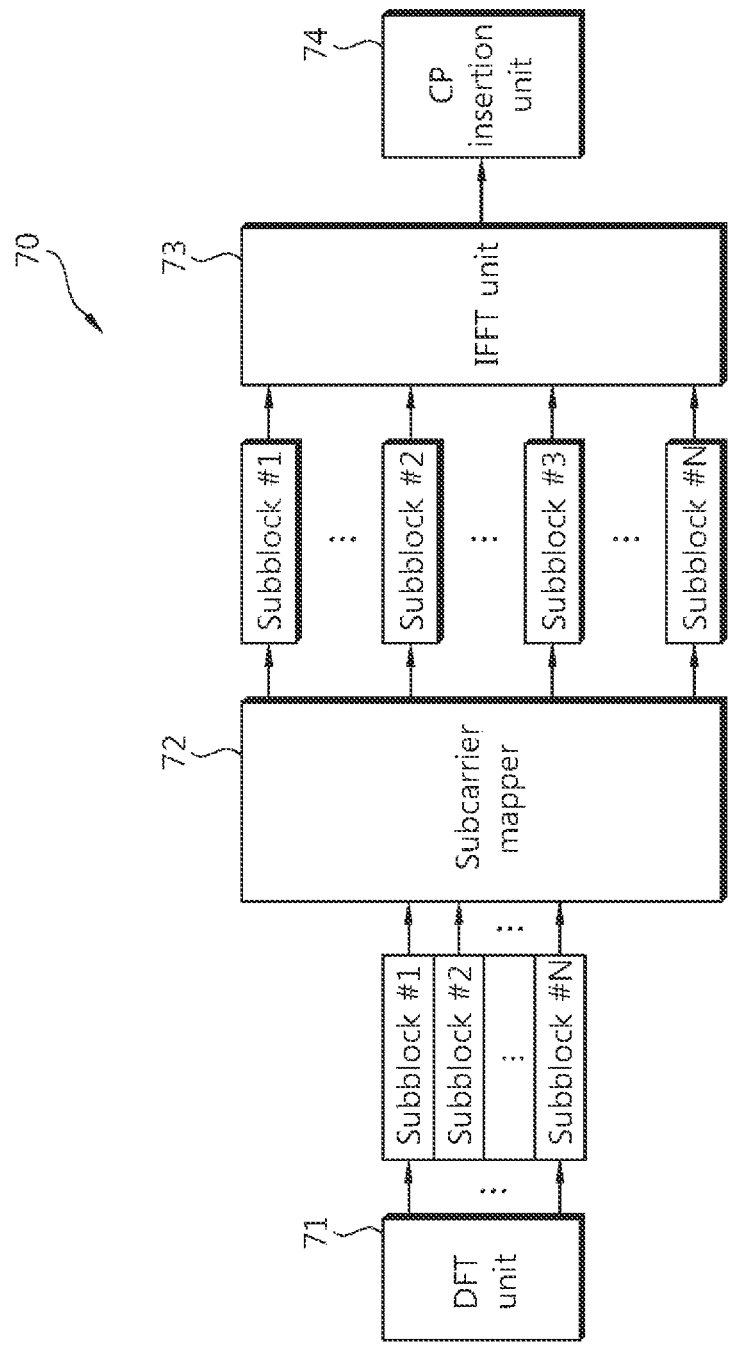
FIG. 10 shows an example of a transmitter using the clustered DFT-s OFDM transmission scheme.

FIG. 10 shows an example of a transmitter using the clustered DFT-s OFDM transmission scheme. Referring to FIG. 10, the transmitter 70 includes a DFT unit 71, a subcarrier mapper 72, an IFFT unit 73, and a CP insertion unit 74. The transmitter 70 may further include a scramble unit (not shown), a modulation mapper (not shown), a layer mapper (not shown), and a layer permutator (not shown), which may be placed in front of the DFT unit 71.

Complex-valued symbols outputted from the DFT unit 71 are divided into N subblocks (N is a natural number). The N subblocks may be represented by a subblock #1, a subblock #2, . . . , a subblock #N. The subcarrier mapper 72 distributes the N subblocks in the frequency domain and maps the N subblocks to subcarriers. The NULL may be inserted every two contiguous subblocks. The complex-valued symbols within one subblock may be mapped to subcarriers contiguous to each other in the frequency domain. That is, the localized mapping scheme may be used within one subblock.

The transmitter 70 of FIG. 10 may be used both in a single carrier transmitter or a multi-carrier transmitter. If the transmitter 70 is used in the single carrier transmitter, all the N subblocks correspond to one carrier. If the transmitter 70 is used in the multi-carrier transmitter, each of the N subblocks may correspond to one carrier. Alternatively, even if the transmitter 70 is used in the multi-carrier transmitter, a plurality of subblocks of the N subblocks may correspond to one carrier. Meanwhile, in the transmitter 70 of FIG. 10, a time domain signal is generated through one IFFT unit 73. Accordingly, in order for the transmitter 70 of FIG. 10 to be used in a multi-carrier transmitter, subcarrier intervals between contiguous carriers in a contiguous carrier allocation situation must be aligned.

Figure 11:
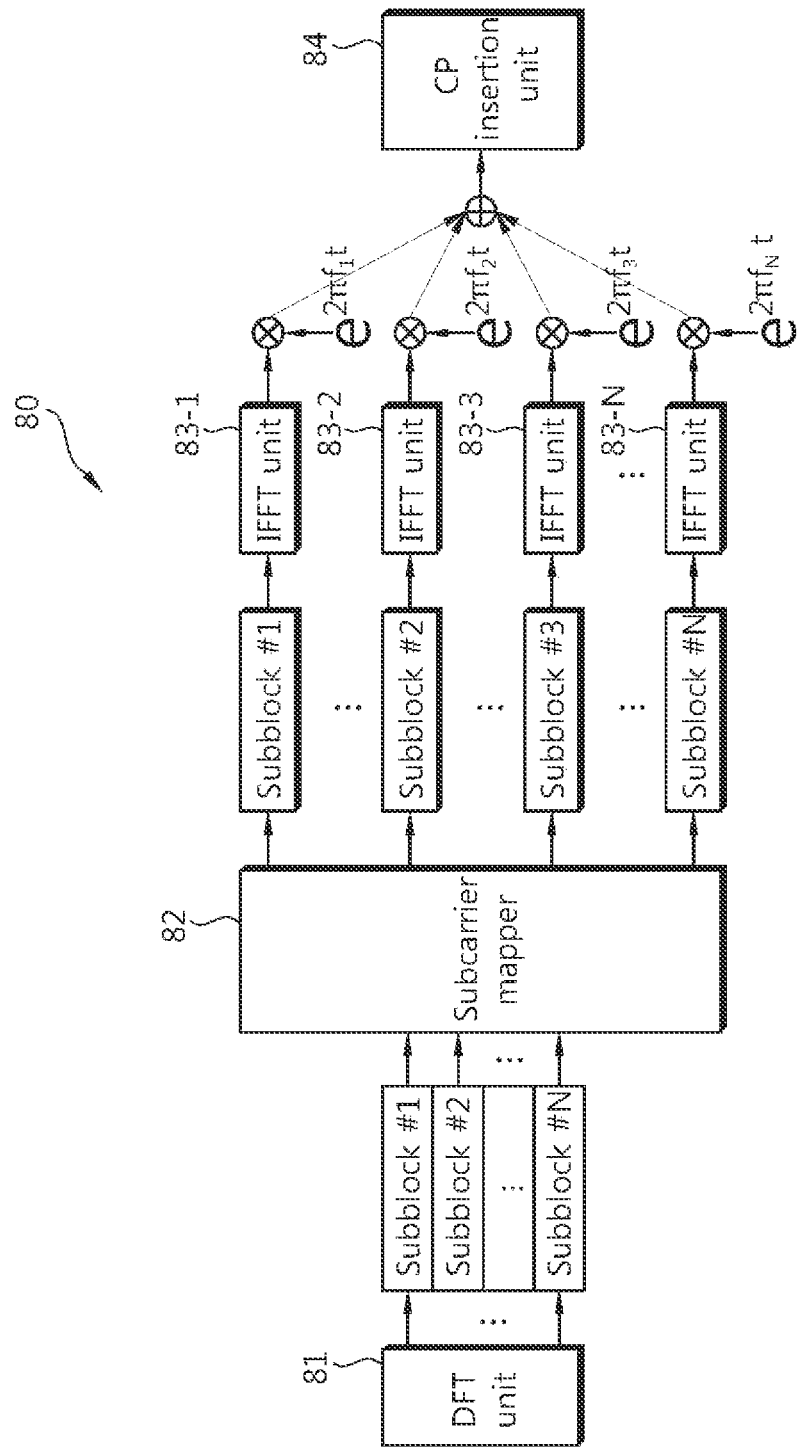
FIG. 11 shows another example of a transmitter using the clustered DFT-s OFDM transmission scheme.

FIG. 11 shows another example of a transmitter using the clustered DFT-s OFDM transmission scheme. Referring to FIG. 11, the transmitter 80 includes a DFT unit 81, a subcarrier mapper 82, a plurality of IFFT units 83-1, 83-2, . . . , 83-N (N is a natural number), and a CP insertion unit 84. The transmitter 80 may further include a scramble unit (not shown), a modulation mapper (not shown), a layer mapper (not shown), and a layer permutator (not shown), which may be placed in front of the DFT unit 71.

IFFT is individually performed on each of N subblocks. An nth IFFT unit 83-n outputs an nth baseband signal (n=1, 2, . . . , N) by performing IFFT on a subblock #n. The nth baseband signal is multiplied by an nth carrier signal to produce an nth radio signal. After the N radio signals generated from the N subblocks are added, a CP is inserted by the CP insertion unit 84. The transmitter 80 of FIG. 11 may be used in a discontinuous carrier allocation situation where carriers allocated to the transmitter are not contiguous to each other.

Figure 12:
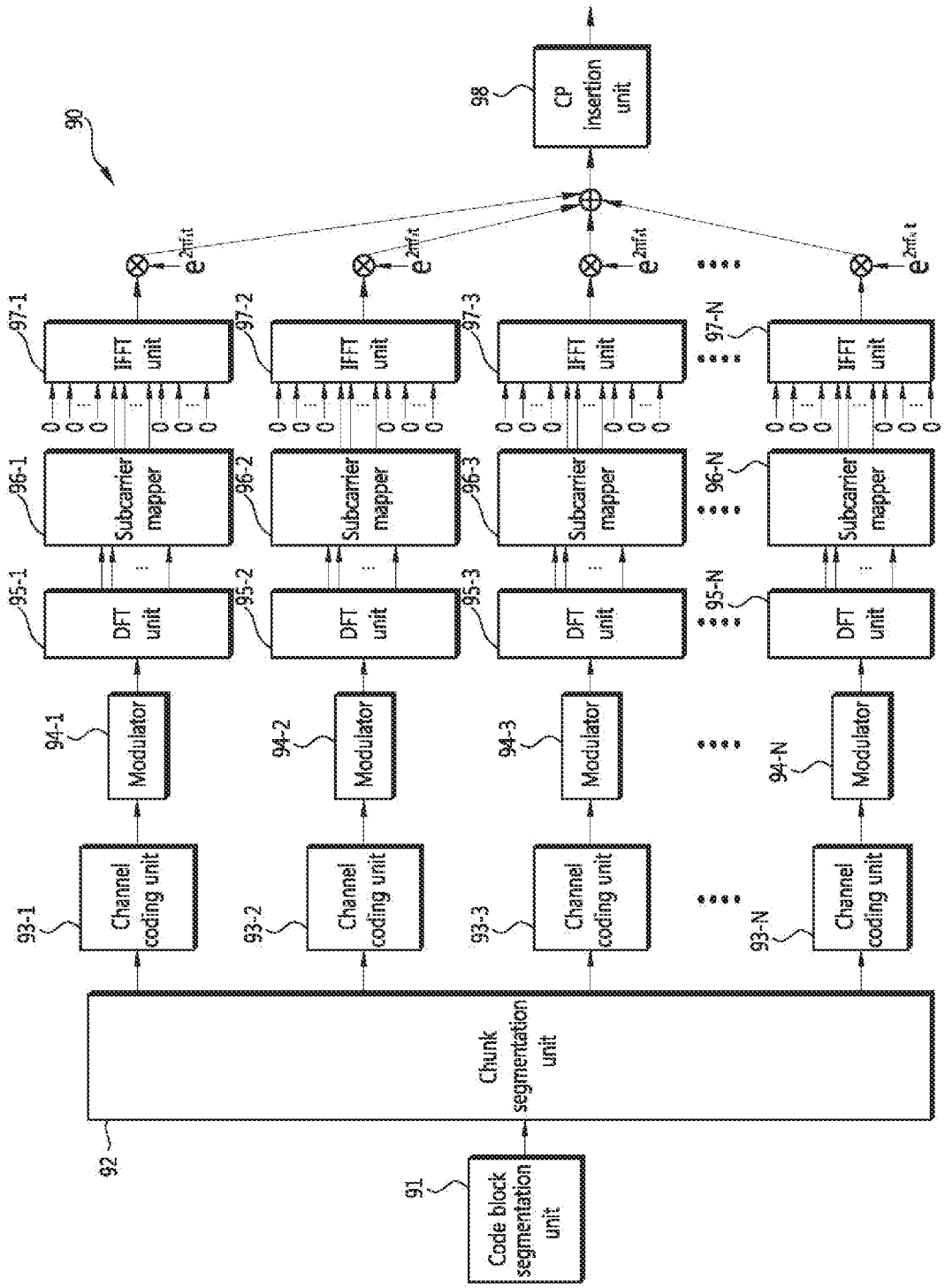
FIG. 12 is yet another example of a transmitter using the clustered DFT-s OFDM transmission scheme.

FIG. 12 is yet another example of a transmitter using the clustered DFT-s OFDM transmission scheme. FIG. 12 is a chunk-specific DFT-s OFDM system performing DFT precoding on a chunk basis. This may be called Nx SC-FDMA. Referring to FIG. 12, the transmitter 90 includes a code block division unit 91, a chunk division unit 92, a plurality of channel coding units 93-1, . . . , 93-N, a plurality of modulators 94-1, . . . , 94-N, a plurality of DFT units 95-1, . . . , 95-N, a plurality of subcarrier mappers 96-1, . . . , 96-N, a plurality of IFFT units 97-1, . . . , 97-N, and a CP insertion unit 98. Here, N may be the number of multiple carriers used by a multi-carrier transmitter. Each of the channel coding units 93-1, . . . , 93-N may include a scramble unit (not shown). The modulators 94-1, . . . , 94-N may also be called modulation mappers. The transmitter 90 may further include a layer mapper (not shown) and a layer permutator (not shown) which may be placed in front of the DFT units 95-1, . . . , 95-N.

The code block division unit 91 divides a transmission block into a plurality of code blocks. The chunk division unit 92 divides the code blocks into a plurality of chunks. Here, the code block may be data transmitted by a multi-carrier transmitter, and the chunk may be a data piece transmitted through one of multiple carriers. The transmitter 90 performs DFT on a chunk basis. The transmitter 90 may be used in a discontinuous carrier allocation situation or a contiguous carrier allocation situation.

A UL reference signal is described below.

A reference signal is generally transmitted as a sequence. A reference signal sequence is not particularly limited and a certain sequence may be used as the reference signal sequence. As the reference signal sequence, a sequence generated through a computer based on phase shift keying (PSK) (i.e., a PSK-based computer generated sequence) may be used. The PSK may include, for example, binary phase shift keying (BPSK), quadrature phase shift keying (QPSK), and the like. Or, as the reference signal sequence, a constant amplitude zero auto-correlation (CAZAC) may be used. The CAZAC sequence may include, for example, a Zadoff-Chu (ZC)-based sequence, a ZC sequence with cyclic extension, a ZC sequence with truncation, and the like. Also, as the reference signal sequence, a pseudo-random (PN) sequence may be used. The PN sequence may include, for example, an m-sequence, a sequence generated through a computer, a gold sequence, a Kasami sequence, and the like. Also, a cyclically shifted sequence may be used as the reference signal sequence.

A UL reference signal may be divided into a demodulation reference signal (DMRS) and a sounding reference signal (SRS). The DMRS is a reference signal used in channel estimation for the demodulation of a received signal. The DMRS may be associated with the transmission of a PUSCH or PUCCH. The SRS is a reference signal transmitted from a UE to a BS for UL scheduling. The BS estimates an UL channel through the received SRS and uses the estimated UL channel in UL scheduling. The SRS is not associated with the transmission of a PUSCH or PUCCH. The same kind of a basic sequence may be used for the DMRS and the SRS. Meanwhile, in UL multi-antenna transmission, precoding applied to the DMRS may be the same as precoding applied to a PUSCH. Cyclic shift separation is a primary scheme for multiplexing the DMRS. In an LTE-A system, the SRS may not be precoded and may be an antenna-specific reference signal.

A reference signal sequence $r_{u,v}(\alpha)(n)$ may be defined based on a basic sequence $b_{u,v}(n)$ and a cyclic shift a according to Equation 2.

$$r_{u,v}^{(\alpha)}(n)=e^{j\alpha n}b_{u,v}(n), 0 \leq n < M_{sc}^{RS} \quad \text{[Equation 2]}$$

In Equation 2, $M_{sc}^{RS}(1 \leq m \leq N_{RB}^{max,UL})$ is the length of the reference signal sequence and $M_{sc}^{RS}=m*Ns_c^{RB}$. $N_{sc}^{RB}$ is the size of a resource block indicated by the number of subcarriers in the frequency domain. $N_{RB}^{max,UL}$ indicates a maximum value of a UL bandwidth indicated by a multiple of $N_{sc}^{RB}$. A plurality of reference signal sequences may be defined by differently applying a cyclic shift value a from one basic sequence.

A basic sequence $b_{u,v}(n)$ is divided into a plurality of groups. Here, $u \in \{0, 1, \ldots, 29\}$ indicates a group index, and v indicates a basic sequence index within the group. The basic sequence depends on the length MscRS of the basic sequence. Each group includes a basic sequence (v=0) having a length of MscRS for m (1≤m≤5) and includes 2 basic sequences (v=0,1) having a length of MscRS for m (6≤m≤nRBmax,UL).

The sequence group index u and the basic sequence index v within a group may vary according to time as in group hopping or sequence hopping.

Furthermore, if the length of the reference signal sequence is $3N_{sc}^{RB}$ or higher, the basic sequence may be defined by Equation 3.

$$b_{u,v}(n) = x_q(n \bmod N_{ZC}^{RS}), 0 \leq n < M_{sc}^{RS} \qquad \text{[Equation 3]}$$

In Equation 3, q indicates a root index of a Zadoff-Chu (ZC) sequence. $N_{ZC}^{RS}$ is the length of the ZC sequence and may be a maximum prime number smaller than $M_{sc}^{RS}$. The ZC sequence having the root index q may be defined by Equation 4.

$$x_q(m) = e^{-j\frac{\pi q m(m+1)}{N_{ZC}^{RS}}}, 0 \leq m \leq N_{ZC}^{RS} - 1 \qquad \text{[Equation 4]}$$

q may be given by Equation 5.

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31 \qquad \text{[Equation 5]}$$

If the length of the reference signal sequence is $3N_{sc}^{RB}$ or less, the basic sequence may be defined by Equation 6.

$$b_{u,v}(n) = e^{j\phi(n)\pi/4}, 0 \leq n \leq M_{sc}^{RS} - 1 \qquad \text{[Equation 6]}$$

Table 1 is an example where $\phi(n)$ is defined when $M_{sc}^{RS} = N_{sc}^{RB}$.

TABLE 1

| | $\phi(0), \ldots, \phi(11)$ | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | 1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

Table 2 is an example where $\phi(n)$ is defined when $M_{sc}^{RS} = 2 \ast N_{sc}^{RB}$.

TABLE 2

| | $\phi(0), \ldots, \phi(23)$ | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 3 | 1 | 1 | -3 | 1 | -3 | -3 | 1 | -3 | -1 | -1 | 3 | 1 | 3 | 1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -1 | -3 | 1 | -1 | -3 | -3 | 1 | -3 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | 3 | -3 | -1 | -3 | -1 |
| 13 | 3 | -1 | -1 | -1 | -1 | -3 | -1 | 3 | 3 | 1 | -1 | 1 | 3 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | -3 | 3 | 3 | 1 | 1 | 3 | -1 | -3 | -1 | -1 | -1 | 3 | 1 | -3 | -3 | -1 | 3 | -3 | -1 | -3 | -1 | -3 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

Hopping of a reference signal may be applied as follows.

The sequence group index u of a slot index ns may be defined based on a group hopping pattern fgh(ns) and a sequence shift pattern fss according to Equation 7.

$$u = (f_{gh}(n_s) + f_{ss}) \bmod 30 \qquad \text{[Equation 7]}$$

17 different group hopping patterns and 30 different sequence shift patterns may exist. Whether to apply group hopping may be indicated by a higher layer.

A PUCCH and a PUSCH may have the same group hopping pattern. A group hopping pattern fgh(ns) may be defined by Equation 8.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \qquad \text{[Equation 8]}$$

In Equation 8, c(i) is a pseudo random sequence that is a PN sequence and may be defined by a Gold sequence of a length-31. Equation 9 shows an example of a gold sequence c(n).

$$c(n) = (x_1(n + N_c) + x_2(n + N_c)) \bmod 2$$

$$x_1(n+31) = (x_1(n+3) + x_1(n)) \bmod 2$$

$$x_2(n+31) = (x_2(n+3) + x_2(n+2) + x_1(n+1) + x_1(n)) \bmod 2 \qquad \text{[Equation 9]}$$

Here, Nc=1600, x1(i) is a first m-sequence, and x2(i) is a second m-sequence. For example, the first m-sequence or the second m-sequence may be initialized according to a cell identifier (ID) for every OFDM symbol, a slot number within one radio frame, an OFDM symbol index within a slot, and the type of a CP. A pseudo random sequence generator may be initialized to $$c_{init} = \left\lfloor \frac{N_{ID}^{cell}}{30} \right\rfloor$$

in the first of each radio frame.

A PUCCH and a PUSCH may have the same sequence shift pattern. The sequence shift pattern of the PUCCH may be fssPUCCH=NIDcell mod 30. The sequence shift pattern of the PUSCH may be fssPUSCH=(fssPUCCH+Δss) mod 30 and Δss∈{0, 1, . . . , 29} may be configured by a higher layer.

Sequence hopping may be applied to only a reference signal sequence having a length longer than 6NscRB. Here, a basic sequence index v within a basic sequence group of a slot index ns may be defined by Equation 10.

$$v = \begin{cases} c(n_s) & \text{if group hopping is disabled and sequence hopping is enabled} \\ 0 & \text{otherwise} \end{cases} \qquad \text{[Equation 10]}$$

c(i) may be represented by an example of Equation 9. Whether to apply sequence hopping may be indicated by a higher layer. A pseudo random sequence generator may be initialized to $$c_{init} = \left\lfloor \frac{N_{ID}^{cell}}{30} \right\rfloor \cdot 2^5 + f_{ss}^{PUSCH}$$

in the first of each radio frame.

A DMRS sequence for a PUSCH may be defined by Equation 11.

$$r^{PUSCH}(m \cdot M_{sc}^{RS} + n) = r_{u,v}^{(\alpha)}(n) \qquad \text{[Equation 11]}$$

In Equation 11, m=0, 1, . . . and n=0, . . . , $M_{sc}^{RS}$−1. $M_{sc}^{RS} = M_{sc}^{PUSCH}$.

α=2πncs/12, that is, a cyclic shift value is given within a slot, and ncs may be defined by Equation 12.

$$n_{cs} = (n_{DMRS}^{(1)} + n_{DMRS}^{(2)} + n_{PRS}(n_s)) \bmod 12 \qquad \text{[Equation 12]}$$

In Equation 12, nDMRS(1) is indicated by a parameter transmitted by a higher layer, and Table 3 shows an example of a corresponding relationship between the parameter and nDMRS(1).

TABLE 3

| Parameter | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

Back in Equation 12, nDMRS(2) may be defined by a cyclic shift field within a DCI format 0 for a transmission block corresponding to PUSCH transmission. The DCI format is transmitted in a PDCCH. The cyclic shift field may have a length of 3 bits.

Table 4 shows an example of a corresponding relationship between the cyclic shift field and nDMRS(2).

TABLE 4

| Cyclic shift field in DCI format 0 | $n_{DMRS}^{(2)}$ |
|---|---|
| 000 | 0 |
| 001 | 6 |
| 010 | 3 |
| 011 | 4 |
| 100 | 2 |
| 101 | 8 |
| 110 | 10 |
| 111 | 9 |

If a PDCCH including the DCI format 0 is not transmitted in the same transmission block, if the first PUSCH is semi-persistently scheduled in the same transmission block, or if the first PUSCH is scheduled by a random access response grant in the same transmission block, nDMRS(2) may be 0.

nPRS(ns) may be defined by Equation 13.

$$n_{PRS}(n_s) = \sum_{i=0}^{7} c(8 N_{symb}^{UL} \cdot n_s + i) \cdot 2^i \qquad \text{[Equation 13]}$$

c(i) may be represented by the example of Equation 9 and may be applied in a cell-specific way of c(i). A pseudo random sequence generator may be initialized to $$c_{init} = \left\lfloor \frac{N_{ID}^{cell}}{30} \right\rfloor \cdot 2^5 + f_{ss}^{PUSCH}$$

in the first of each radio frame.

A DMRS sequence rPUSCH is multiplied by an amplitude scaling factor βPUSCH and mapped to a physical transmission block, used in relevant PUSCH transmission, from rPUSCH(0) in a sequence starting. The DMRS sequence is mapped to a fourth OFDM symbol (OFDM symbol index 3) in case of a normal CP within one slot and mapped to a third OFDM symbol (OFDM symbol index 2) within one slot in case of an extended CP.

An SRS sequence rSRS(n)=ru,v(α)(n) is defined. u indicates a PUCCH sequence group index, and v indicates a basic sequence index. The cyclic shift value α is defined by Equation 14.

$$\alpha = 2\pi \frac{n_{SRS}^{cs}}{8}$$ [Equation 14]

nSRScs is a value configured by a higher layer in related to each UE and may be any one of integers from 0 to 7.

Meanwhile, an orthogonal code cover (OCC) can be applied to a reference signal sequence. The OCC implies a code having orthogonality and applicable to a sequence. Although different sequences can be used to distinguish a plurality of channels in general, the OCC can be used to distinguish the plurality of channels.

The OCC can be used for the following purposes.

1) The OCC can be applied to increase an amount of radio resources allocated to an uplink reference signal.

For example, when a cyclic shift value of a reference signal transmitted in 1st and 2nd slots is assigned 'a', a minus sign (−) can be assigned to the reference signal transmitted in the 2nd slot. That is, a 1st user can transmit a reference signal having a cyclic shift value 'a' and assigned a plus sign (+) in the 2nd slot, and a 2nd user can transmit a reference signal having the cyclic shift value 'a' and assigned the minus sign (−) in the 2nd slot. A BS can estimate a channel of the 1st user by adding the reference signal transmitted in the 1st slot and the reference signal transmitted in the 2nd slot. Further, the BS can estimate a channel of the 2nd user by subtracting the reference signal transmitted in the 2nd slot from the reference signal transmitted in the 1st slot. That is, by applying the OCC, the BS can distinguish the reference signal transmitted by the 1st user and the reference signal transmitted by the 2nd user. Accordingly, since at least two users use the same reference signal while using different OCCs, an amount of available radio resources can be increased by two-fold.

When transmitting an uplink reference signal by applying the OCC, a field for indicating the applied OCC can be allocated in a downlink control signal. For example, when it is assumed that an OCC indicator field is allocated with a 1-bit length in the downlink control signal, the OCC indicator can be expressed by Table 5.

TABLE 5

|   | 1st slot | 2nd slot |
|---|---|---|
| 0 | 1 | 1 |
| 1 | 1 | −1 |

Referring to Table 5, when a value of the OCC indicator is 0, a plus sign (+) is applied to a reference signal transmitted in the 2nd slot, and when the value of the OCC indicator is 1, a minus sign (−) is applied to a reference signal transmitted in the 2nd slot.

2) The OCC can be applied to increase an interval of cyclic shift values allocated to multiple antennas or multiple layers of a single user. Although the cyclic shift values allocated to the multiple layers are described hereinafter, the present invention can also apply to the cyclic shift values allocated to the multiple antennas.

An uplink reference signal distinguishes a channel on the basis of a cyclic shift value. In a multi-antenna system, in order to distinguish a plurality of layers, different cyclic shift values can be allocated to reference signals of the respective layers. The cyclic shift value to be allocated must be increased in proportion to the number of layers, and thus an interval between cyclic shift values is decreased. Accordingly, it becomes difficult to distinguish the plurality of channels, thereby decreasing channel estimation capability. To overcome this problem, an OCC can be applied to each layer. For example, assume that cyclic shift offsets of reference signals for the layers are respectively allocated to 0, 6, 3, and 9 for four antennas. An interval of the cyclic shift values between the reference signals for the respective layers is 3. In this case, the interval of the cyclic shift values between the reference signals of the respective layers can be increased to 6 by applying an OCC with a minus sign (−) to 3rd and 4th layers. That is, when reference signal sequences with a length N and applied to a 1st slot of 1st to 4th layers are respectively denoted by (S01, . . . , S0N), (S61, . . . , S6N), (S31, . . . , S3N), and (S91, . . . , S9N), reference signal sequences applied to a 2nd slot of the 1st to 4th layers are respectively (S01, . . . , S0N), (S61, . . . , S6N), (−S31, . . . , −S3N), and (−S91, . . . , −S9N). When the reference signal sequences of the two slots are added, only reference signals of the 1st and 2nd layers remain, and thus an interval of cyclic shift values is 6. Likewise, when the reference signal sequences of the two slots are subtracted, only reference signals of the 3rd and 4th layers remain, and thus the interval of cyclic shift values is also 6. Accordingly, channel estimation capability can be increased.

Likewise, assume that cyclic shift offsets of reference signals for the layers are respectively allocated to 0, 6, and 3 for three layers. An interval of the cyclic shift values between the reference signals for the respective layers is 3. In this case, the interval of the cyclic shift values between the reference signals of the respective layers can be increased to 6 by applying an OCC with the minus sign (−) to a 3rd layer. That is, when reference signal sequences with a length N and applied to a 1st slot of 1st to 3rd layers are respectively denoted by (S01, . . . , S0N), (S61, . . . , S6N), and (S31, . . . , S3N), reference signal sequences applied to a 2nd slot of the 1st to 3rd layers are respectively (S01, . . . , S0N), (S61, . . . , S6N), (−S31, . . . , −S3N). When the reference signal sequences of the two slots are added, only reference signals of the 1st and 2nd layers remain, and thus an interval of cyclic shift values is 6. Likewise, when the reference signal sequences of the two slots are subtracted, only a reference signal of the 3rd layer remains. Accordingly, channel estimation capability can be increased.

3) The OCC can be applied to increase an interval of cyclic shift values allocated to a single user.

In a multi user-MIMO (MU-MIMO) system having multiple antennas and including a plurality of users, the OCC can be applied to a cyclic shift value. For example, from the perspective of the single user which performs MIMO transmission, in order to distinguish a plurality of antennas or a plurality of layers, a cyclic shift value having a great interval can be allocated between the respective antennas or the respective layers, whereas from the perspective of multiple users, a cyclic shift interval between the respective users can be decreased. To overcome this problem, the OCC can be applied. When the OCC is applied, the same cyclic shift value can be applied between multiple users according to an OCC type.

Meanwhile, when an orthogonal covering code (OCC) is applied, regarding an OCC applied to each layer to be mapped to a plurality of codewords, the same OCC can be applied within the same codeword, and different OCCs can be applied between codewords. In a multi-antenna system using N codewords and supporting up to M layers, a plurality of layers can be mapped to a specific codeword. For example, in a system transmitting 2 codewords and supporting 3 layers, a 1st layer can be mapped to a 1st codeword, and 2nd and 3rd layers can be mapped to a 2nd codeword. Alternatively, in a system transmitting 2 codewords and supporting 4 layers, 1st and 2nd layers can be mapped to a 1st codeword and 3rd and 4th layers can be mapped to a 2nd codeword.

Table 6 shows an example of an OCC applied to each layer mapped to a plurality of codewords.

TABLE 6

|  | $1^{st}$ Layer | $2^{nd}$ Layer | $3^{rd}$ Layer | $4^{th}$ Layer |
|---|---|---|---|---|
| Rank-1 | (1, 1) |  |  |  |
|  | (1, −1) |  |  |  |
| Rank-2 | (1, 1) | (1, −1) |  |  |
|  | (1, −1) | (1, 1) |  |  |
| Rank-3 | (1, 1) | (1, −1) | (1, −1) |  |
|  | (1, −1) | (1, 1) | (1, 1) |  |
| Rank-4 | (1, 1) | (1, 1) | (1, −1) | (1, −1) |
|  | (1, −1) | (1, −1) | (1, 1) | (1, 1) |

In Table 6, (a,b) denotes an OCC applied to (1st slot, 2nd slot) or (2nd slot, 1st slot). Referring to Table 6, in case of rank-2, an OCC applied to a reference signal of a 1st layer to which a 1st codeword is mapped is different from an OCC applied to a reference signal of a 2nd layer to which a 2nd codeword is mapped. In case of rank-3, an OCC applied to a reference signal of a 1st layer to which a 1st codeword is mapped is different from an OCC applied to reference signals of 2nd and 3rd layers to which a 2nd codeword is mapped. The same OCC is applied to the reference signals of the 2nd layer and the reference signal of the 3rd layer. Likewise, in case of rank-4, an OCC applied to reference signals of 1st and 2nd layers to which a 1st codeword is mapped is different from an OCC applied to reference signals of 3rd and 4th layers to which a 2nd codeword is mapped.

Table 7 shows an example of applying the OCC when there are four antennas or four layers.

TABLE 7

| | Types | | | | | | | |
|---|---|---|---|---|---|---|---|---|
| | Type 1 | | Type 2 | | Type 3 | | Type 4 | |
| Layer/Antenna | A | B | A | B | A | B | A | B |
| 1 | (1, 1) | (1, −1) | (1, 1) | (1, −1) | (1, 1) | (1, −1) | (1, 1) | (1, −1) |
| 2 | (1, 1) | (1, −1) | (1, 1) | (1, −1) | (1, −1) | (1, 1) | (1, −1) | (1, 1) |
| 3 | (1, 1) | (1, −1) | (1, −1) | (1, 1) | (1, 1) | (1, −1) | (1, −1) | (1, 1) |
| 4 | (1, 1) | (1, −1) | (1, −1) | (1, 1) | (1, −1) | (1, 1) | (1, −1) | (1, −1) |

In Table 7, (a,b) denotes an OCC applied to (1st slot, 2nd slot) or (2nd slot, 1st slot). A 1-bit OCC type field for indicating a type of applying the OCC can be added to a downlink control signal for indicating a cyclic shift value.

Table 8 shows an example of an OCC type field.

TABLE 8

| Codeword of OCC | Type |
|---|---|
| 0 | A (/B) |
| 1 | B (/A) |

In Table 8, if a value of the OCC type field is 0, the type A-(or type-B) OCC of Table 7 can be applied, and if the value of the OCC type field is 1, the type B-(or type-A) OCC of Table 7 can be applied.

Referring to the type 1-B of Table 7, the minus sign (−) is applied to all layers' or antennas' reference signals transmitted in any one slot. As such, when the OCC is applied, the OCC may be applied to some users and the OCC may not be applied to the other users. The OCC can be utilized as a resource, or can be used to increase an interval of cyclic shift values between multiple users.

Referring to the type 2-A of Table 7, the minus sign (−) is applied to some layers' or antennas' reference signals transmitted in any one slot. In the type 2-A, the minus sign (−) is applied to a reference signal of a 3rd layer (or antenna) or a 4th layer (or antenna). The OCC can be utilized as a resource, or can be used to increase an interval of cyclic shift values between multiple users.

Table 9 shows an example of applying the type-2 OCC of Table 6 to two users.

TABLE 9

|  | $1^{st}$ Slot | $2^{nd}$ Slot |
|---|---|---|
| UE 1 | 0 6 3 9 | 0 6 −3 −9 |
| UE 2 | 4 10 | 4 10 |

The $1^{st}$ user transmits a reference signal with respect to four layers, and the $2^{nd}$ user transmits a reference signal with respect to two layers. The type 2-A OCC of Table 7 is applied to both the $1^{st}$ and $2^{nd}$ users. Accordingly, the minus sign (−) is applied to reference signals of $3^{rd}$ and $4^{th}$ layers of the $1^{st}$ user, and the minus sign (−) is not applied to reference signals of $1^{st}$ and $2^{nd}$ layers of the $2^{nd}$ user.

Referring to the type 3-A of Table 7, the minus sign (−) is applied to some layers' or antennas' reference signals transmitted in any one slot. In the type 3-A, the minus sign (−) is applied to a reference signal of a 2nd layer (or antenna) or a 4th layer (or antenna). The OCC can be utilized as a resource, or can be used to increase an interval of cyclic shift values between multiple users.

Referring to the type 4-A of Table 7, the minus sign (−) is applied to some layers' or antennas' reference signals transmitted in any one slot. In the type 4-A, the minus sign (−) is applied to a reference signal of a 2nd layer (or antenna) or a 3rd layer (or antenna). The OCC can be utilized as a resource, or can be used to increase an interval of cyclic shift values between multiple users.

Hereinafter, the proposed reference signal transmission method will be described. According to the proposed reference signal transmission method, cyclic shift values for reference signals of a plurality of layers or a plurality of antennas can be applied variously. Although a case where the cyclic shift values are allocated to the reference signals of the plurality of layers is described hereinafter, the present invention is not limited thereto, and thus can also apply to a case where the cyclic shift values are allocated to the reference signals of the plurality of antennas.

First, cyclic shift values can constitute a set without considering the OCC, and thus can be allocated to reference signals of the plurality of layers.

The cyclic shift values can be allocated by considering a single user-MIMO (SU-MIMO) system. Due to a characteristic of a reference signal sequence used for uplink reference signal transmission of 3GPP LTE rel-8, a shift occurs in a time domain by a value corresponding to an allocated cyclic shift value. For example, if an FFT size is 512, when an interval of cyclic shift values is 1, the interval corresponds to 43 samples in a time domain. Meanwhile, a channel impulse response exists in a CP period in general. After receiving the channel impulse response existing in the CP period, it can be replaced with a frequency-domain signal to obtain an estimated channel. In case of multi-antenna transmission, a signal received from each antenna has a similar delay in general, and the channel impulse response may exist in the CP period or may be slightly deviated from the CP period. Therefore, by allocating a cyclic shift value having an interval equal to or greater than 1 or 2 in an SU-MIMO environment, a channel impulse response experienced by a signal transmitted from each antenna can be obtained sufficiently without interference between antennas. Accordingly, a minimum interval of cyclic shift values between respective layers is preferably equal to or greater than 1 in the SU-MIMO.

A cyclic shift value can be applied by considering a multi-user MIMO (MU-MIMO) system. Although a plurality of users' signals received by a BS can be received in a similar duration through a timing advanced process, there is no alternative but to have a time difference between received signals. When signals transmitted by a plurality of users which use the same time or frequency resource are separated by using a spatial multiplexing (SM) scheme, there is a need to obtain a channel of each of the plurality of users. In addition, when the channel is estimated based on code division multiplexing (CDM), a code or sequence which can minimize interference can be allocated to each of the plurality of users. Therefore, a different cyclic shift value needs to be allocated to each of the plurality of users. In this case, a cyclic shift value can be allocated such that an interval of each cyclic shift value is maximized between UEs which perform MU-MIMO transmission, and a cyclic shift value can be allocated such that the cyclic shift value between layers or antennas in the UE has a relatively small interval.

A set of cyclic shift values can be configured variously. For example, the set of cyclic shift values may be {0,2,3,4,6,8,9,10} which is a set of 8 cyclic shift values defined in 3GPP LTE rel-8. In a normal CP or extended CP, a cyclic shift value can be selected from the set. In addition, a subset of the set can be used. For example, a cyclic shift value can be selected from the subset consisting of {0,3,6,9}. When a channel has a long delay spread, a subset consisting of cyclic shift values having a great interval of the cyclic shift values can be used.

For another example, the set of cyclic shift values may be {0,1,2,3,4,5,6,7,8,9,10,11} which is a set of 12 cyclic shift values. In addition, a subset of the set can be used.

For another example, the set of cyclic shift values may be {0,4,8,2,6,10,3,9} which is a set of 8 cyclic shift values. In this case, in a cyclic shift value defined in 3GPP LTE rel-8, the cyclic shift value is selected such that cyclic shift values have an interval of 4, and if the cyclic shift value is greater than 12, the cyclic shift value is selected by performing a modulo operation. If there is a pre-selected value, a value closest to the selected value can be selected. If the set of cyclic shift values is a set of 12 cyclic shift values, the set may be {0,4,8,1,5,9,2,6,10}.

The cyclic shift set determined by using the aforementioned method can be indicated through a cyclic shift indicator allocated to a DCI format transmitted through a PDCCH. The cyclic shift indicator may have a length of 3 bits. By using a cyclic shift value indicated by the cyclic shift indicator as a start point of a cyclic shift set, and cyclic shift offsets can be allocated by the number of layers. An allocation order of the cyclic shift offsets may be sequential or may conform to a predetermined rule. The predetermined rule may be any sequence or may be an order based on an offset. For example, if a cyclic shift set is {0,2,3,4,6,8,9,10}, a cyclic shift indicator is 0, and the number of layers is 2, then starting from a cyclic shift value 0 in the cyclic shift set, cyclic shift values 0 and 2 can be selected as cyclic shift values of uplink reference signal sequences.

In addition to the cyclic shift indicator, a selection offset can be additionally allocated in a DCI format. Starting from a cyclic shift value indicated by the cyclic shift indicator, cyclic shift values of reference signal sequences for a plurality layers can be allocated with an interval corresponding to a value indicated by the selection offset. The selection offset may have a length of 1 bit or two bits. If the selection offset has a length of 1, the selection offset may be any one of {1,2}, {1,3}, and {1,4}. If the selection offset has a length of 2, the selection offset may be any one of {1,2,3,4}. For example, if a cyclic shift indicator is 3 bits, a selection offset is 1 bit, a cyclic shift set consists of {0,2,3,4,6,8,9,10}, a cyclic shift indicator and a selection offset used by a 1st user are respectively '000' and '0', and a cyclic shift indicator and a selection offset used by a 2nd user are respectively '101' and '1', then cyclic shift values of reference signals of respective layers of the 1st user may be {0,2}, and cyclic shift values of reference signals of respective layers of the 2nd user may be {8,10}.

Meanwhile, if the number of layers is 3, two cyclic shift indicators can be allocated from the DCI format and thus can be used as cyclic shift values of reference signals of two layers, and a cyclic shift value of a reference signal of the remaining one layer can be allocated based on any one of the two cyclic shift indicators indicated by a PDCCH. In this case, the cyclic shift value of the reference signal of the remaining one layer can be implicitly determined based on a selection offset without additional signaling. Alternatively, the cyclic shift value of the reference signal of the remaining layer can be allocated based on any one of the two cyclic shift indicators.

The above description is also applied to a case where the number of layers is 4. Two cyclic shift indicators can be allocated from the DCI format and thus can be used as cyclic shift values of reference signals of two layers, and cyclic shift values of reference signals of the remaining two layers can be allocated based on the two cyclic shift indicators. For example, a cyclic shift value of a reference signal of a 3rd layer can be based on a cyclic shift value of a reference signal of a 1st layer, and a cyclic shift value of a reference signal of a 4th layer can be based on a cyclic shift value of a reference signal of a 2nd layer. The cyclic shift values of the reference signals of the remaining two layers can be implicitly determined based on a selection offset without additional signaling.

Although allocation of a cyclic shift value of an uplink DMRS has been described above by considering a plurality of layers, the present invention is not limited thereto, and thus can also apply to an uplink sounding reference signal. In this case, the present invention can apply specifically to an uplink sounding reference signal by varying a cyclic shift indicator allocated for the DMRS, and a cyclic shift set, etc. In addition, a signaling overhead can be prevented from occurring by directly applying the cyclic shift indicator for the DMRS or the cyclic shift value to the sounding reference signal.

Hereinafter, a method of allocating a cyclic shift value of a reference signal sequence of each layer by combining a cyclic shift index for indicating a cyclic shift value and an OCC index for indicating an OCC will be described. In this case, the cyclic shift value can be determined such that an interval of cyclic shift values of reference signals of respective layers is maximized. Alternatively, the cyclic shift value of the reference signals of the respective layers can be determined by using a cyclic shift indicator without additional signaling of the OCC index. In the following description, the cyclic shift index and the OCC index are described by using a table. In addition, although it is assumed that the number of layers is 4, when the number of layers is less than or equal to 4, it is also possible to use only cyclic shift values for some layers among cyclic shift values proposed in the corresponding table.

First, cyclic shift values can be allocated such that an interval of cyclic shift values of reference signals between 1st and 2nd layers and an interval of cyclic shift values of reference signals between 3rd and 4th layers are maximized. According to the applied OCC, only reference signals of the 1st and 2nd layers may remain and channel estimation may be performed in this state, and on the other hand, only reference signals of the 3rd and 4th layers may remain and channel estimation may be performed in this state.

Table 10 shows an example in which a cyclic shift index and an OCC index are mapped according to the proposed invention.

TABLE 10

| Index i (cyclic shift) | Cyclic Shift Field in DCI format 0 | $n_{DMRS}^{(2)}$ | OCC index |
|---|---|---|---|
| 0 | 000 | 0 | 0 |
| 1 | 001 | 6 | 0 |
| 2 | 010 | 3 | 1 |
| 3 | 011 | 4 | 1 |
| 4 | 100 | 2 | 0 |
| 5 | 101 | 8 | 0 |
| 6 | 110 | 10 | 1 |
| 7 | 111 | 9 | 1 |

According to Table 10, a cyclic shift index i and an OCC index are mapped. A cyclic shift field in DCI format 0 indicated by the cyclic shift index and nDMRS(2) to be mapped to the cyclic shift field are mapped to the OCC index. That is, the same OCC index is always applied to the value nDMRS (2). For example, if nDMRS(2)=0, the OCC index may be always 0, and if nDMRS(2)=3, the OCC index may be always 1. In this case, when the OCC index is 0, it implies that an OCC applied to 1st and 2nd slots are [1 1], and when the OCC is 1, it implies that an OCC applied to the 1st and 2nd slots are [1 −1]. Alternatively, the opposite is also applicable.

Table 11 shows a cyclic shift value of a reference signal of each layer applied according to Table 10.

TABLE 11

| Index i(cyclic shift) | Cyclic Shift Field in DCI format 0 [3] | $n_{DMRS}^{(2)}$ | Cyclic shift value of RS for rank-1 index | Cyclic shift value of RS for rank-2 index | Cyclic shift value of RS for rank-3 index | Cyclic shift value of RS for rank-4 index |
|---|---|---|---|---|---|---|
| 0 | 000 | 0 | 0 | 6 | −3 | −9 |
| 1 | 001 | 6 | 6 | 0 | −9 | −3 |
| 2 | 010 | 3 | −3 | −9 | 6 | 0 |
| 3 | 011 | 4 | −4 | −10 | 8 | 2 |
| 4 | 100 | 2 | 2 | 8 | 4 | 10 |
| 5 | 101 | 8 | 8 | 2 | −10 | −4 |
| 6 | 110 | 10 | −10 | −4 | 2 | 8 |
| 7 | 111 | 9 | −9 | −3 | 0 | 6 |

In Table 11, a minus sign (−) implies that an OCC index 1 is applied and thus the minus sign (−) is applied to a reference signal transmitted in a 2nd slot. According to Table 11, cyclic shift values of reference signals of 1st and 2nd layers maintain a maximum interval, and likewise cyclic shift values of reference signals of 3rd and 4th layers also maintain a maximum interval. When the number of layers is 2 or 3, only some of cyclic shift values of Table 11 can be used.

Alternatively, the cyclic shift values of the reference signals of the respective layers can be allocated such that interference is reduced to the maximum extent possible in rank-2 transmission. Although an interval of the cyclic shift values of the reference signals of the respective layers is not maximized in rank-4 transmission, according to the applied OCC, only reference signals of the 1st and 3rd layers may remain and channel estimation may be performed in this state, and on the other hand, only reference signals of the 2nd and 4th layers may remain and channel estimation may be performed in this state.

Table 12 shows an example in which a cyclic shift index and an OCC index are mapped according to the proposed invention.

TABLE 12

| Index i (cyclic shift) | Cyclic Shift Field in DCI format 0 | $n_{DMRS}^{(2)}$ | OCC index |
|---|---|---|---|
| 0 | 000 | 0 | 0 |
| 1 | 001 | 6 | 1 |
| 2 | 010 | 3 | 0 |
| 3 | 011 | 4 | 1 |
| 4 | 100 | 2 | 0 |
| 5 | 101 | 8 | 1 |
| 6 | 110 | 10 | 0 |
| 7 | 111 | 9 | 1 |

Table 13 shows a cyclic shift value of a reference signal of each layer applied according to Table 12.

TABLE 13

| Index i(cyclic shift) | Cyclic Shift Field in DCI format 0 [3] | $n_{DMRS}^{(2)}$ | Cyclic shift value of RS for rank-1 index | Cyclic shift value of RS for rank-2 index | Cyclic shift value of RS for rank-3 index | Cyclic shift value of RS for rank-4 index |
|---|---|---|---|---|---|---|
| 0 | 000 | 0 | 0 | −6 | 3 | −9 |
| 1 | 001 | 6 | −6 | 0 | −9 | 3 |
| 2 | 010 | 3 | 3 | −9 | −6 | 0 |
| 3 | 011 | 4 | −4 | 10 | −8 | 2 |
| 4 | 100 | 2 | 2 | 8 | 4 | 10 |
| 5 | 101 | 8 | 8 | 2 | −10 | −4 |
| 6 | 110 | 10 | −10 | −4 | 2 | 8 |
| 7 | 111 | 9 | −9 | −3 | 0 | 6 |

When the number of layers is 2 or 3, only some of cyclic shift values of Table 12 can be used.

According to the number of layers, it is also possible to allocate cyclic shift values based on different rules. For example, the cyclic shift values of Table 10 can be allocated in case of rank-2 transmission, and the cyclic shift values of Table 12 can be allocated in case of rank-4 transmission. Alternatively, the cyclic shift values of Table 12 can be allocated in case of rank-2 transmission, and the cyclic shift values of Table 10 can be allocated in case of rank-4 transmission.

The cyclic shift value can be allocated by combining a cyclic shift value and an OCC.

When the number of layers is 1, different cyclic shift values can be allocated according to a cyclic shift index. However, in case of a plurality of layers, the same cyclic shift value can be allocated even though cyclic shift indices are different. For example, any one of {0,6,3,4,2,8,10,9} can be used as a cyclic shift value of a reference signal of one layer, and any one of {(0,6),(6,0),(3,9),(4,10),(2,8),(8,2),(10,4),(9,3)} can be used as cyclic shift values of reference signals of two layers. In this case, (0,6)-(6,0)/(3,9)-(9,3)/(4,10)-(10,4)/(2,8)-(8,2) have the same cyclic shift value even though cyclic shift indices are different. Accordingly, in this case, the OCC can be applied to maintain orthogonality. For example, the OCC can be applied such as (0,6),(−6,−0). In this case, if a minus sign (−) is applied to reference signals of 1st and 2nd layers, a plus sign (+) can be applied to reference signals of 3rd and 4th layers.

Table 14 shows an example of a cyclic shift value of a reference signal of each layer according to the proposed invention.

TABLE 14

| Index i(cyclic shift) | Cyclic Shift Field in DCI format 0 [3] | $n_{DMRS}^{(2)}$ | Cyclic shift value of RS for rank-1 index | Cyclic shift value of RS for rank-2 index | Cyclic shift value of RS for rank-3 index | Cyclic shift value of RS for rank-4 index |
|---|---|---|---|---|---|---|
| 0 | 000 | 0 | 0 | 6 | −3 | −9 |
| 1 | 001 | 6 | −6 | −0 | 9 | 3 |
| 2 | 010 | 3 | 3 | 9 | −6 | −0 |
| 3 | 011 | 4 | −4 | −10 | 8 | 2 |
| 4 | 100 | 2 | −2 | −8 | 4 | 10 |
| 5 | 101 | 8 | 8 | 2 | −10 | 4 |
| 6 | 110 | 10 | 10 | 4 | −2 | −8 |
| 7 | 111 | 9 | −9 | −3 | 0 | 6 |

Table 15 shows another example of a cyclic shift value of a reference signal of each layer according to the proposed invention.

TABLE 15

| Index i(cyclic shift) | Cyclic Shift Field in DCI format 0 [3] | $n_{DMRS}^{(2)}$ | Cyclic shift value of RS for rank-1 index | Cyclic shift value of RS for rank-2 index | Cyclic shift value of RS for rank-3 index | Cyclic shift value of RS for rank-4 index |
|---|---|---|---|---|---|---|
| 0 | 000 | 0 | 0 | 6 | 3 | 9 |
| 1 | 001 | 6 | 6 | 0 | 9 | 3 |
| 2 | 010 | 3 | 3 | 9 | 6 | 0 |
| 3 | 011 | 4 | 4 | 10 | 7 | 1 |
| 4 | 100 | 2 | 2 | 8 | 5 | 11 |
| 5 | 101 | 8 | 8 | 1 | 11 | 4 |
| 6 | 110 | 10 | 10 | 4 | 1 | 7 |
| 7 | 111 | 9 | 9 | 3 | 0 | 6 |

Table 16 shows an example of applying the OCC to the reference signal of the 3rd and 4th layers of Table 15.

TABLE 16

| Index i(cyclic shift) | Cyclic Shift Field in DCI format 0 [3] | $n_{DMRS}^{(2)}$ | Cyclic shift value of RS for rank-1 index | Cyclic shift value of RS for rank-2 index | Cyclic shift value of RS for rank-3 index | Cyclic shift value of RS for rank-4 index |
|---|---|---|---|---|---|---|
| 0 | 000 | 0 | 0 | 6 | −3 | −9 |
| 1 | 001 | 6 | 6 | 0 | −9 | −3 |
| 2 | 010 | 3 | 3 | 9 | −6 | −0 |
| 3 | 011 | 4 | 4 | 10 | −7 | −1 |
| 4 | 100 | 2 | 2 | 8 | 5 | −11 |
| 5 | 101 | 8 | 8 | 1 | −11 | −4 |
| 6 | 110 | 10 | 10 | 4 | −1 | −7 |
| 7 | 111 | 9 | 9 | 3 | −0 | −6 |

Table 17 shows an example of applying the OCC to the reference signal of the 1st layer of Table 15.

TABLE 17

| Index i(cyclic shift) | Cyclic Shift Field in DCI format 0 [3] | $n_{DMRS}^{(2)}$ | Cyclic shift value of RS for rank-1 index | Cyclic shift value of RS for rank-2 index | Cyclic shift value of RS for rank-3 index | Cyclic shift value of RS for rank-4 index |
|---|---|---|---|---|---|---|
| 0 | 000 | 0 | 0 | 6 | −3 | −9 |
| 1 | 001 | 6 | −6 | −0 | 9 | 3 |
| 2 | 010 | 3 | 3 | 9 | −6 | −0 |
| 3 | 011 | 4 | −4 | −10 | 7 | 1 |
| 4 | 100 | 2 | −2 | −8 | 5 | 11 |
| 5 | 101 | 8 | 8 | 1 | −11 | −4 |
| 6 | 110 | 10 | 10 | 4 | −1 | −7 |
| 7 | 111 | 9 | −9 | −3 | 0 | 6 |

When the number of layers is less than or equal to 4, only cyclic shift values of reference signals of some layers may be allocated among the cyclic shift values of Table 14 to Table 17.

Hereinafter, it is proposed a method of allocating an OCC and a cyclic shift value with respect to each of a plurality of layers according to a cyclic shift value in a DCI format transmitted through a PDCCH. Although it is described hereinafter that the proposed invention is applied to a MU-MIMO system, the present invention is not limited thereto, and thus can also be applied to an SU-MIMO system.

When allocating a cyclic shift value in the MU-MIMO system, a cyclic shift value of a reference signal of each layer is allocated such that an interval of cyclic shift values between reference signals of respective layers in one UE is maximized. For example, in rank-4 transmission, a cyclic shift value can be allocated such that an interval of cyclic shift values of reference signals between 1st and 2nd layers and an interval of cyclic shift values of reference signals of 3rd and 4th layers are maximized. In this case, OCCs with different signs can be applied to a cyclic shift value having a narrow interval to minimize the interval between layers.

Table 18 shows an example of a cyclic shift field in a DCI format, a cyclic shift value allocated to each layer, and an OCC.

TABLE 18

| Cyclic Shift Field | $n_{DMRS}^{(2)}$ | Slot0 | | | | | | | | Slot1 | | | | | | | |
|---|---|---|---|---|---|---|---|---|---|---|---|---|---|---|---|---|---|
| | | L0 | | L1 | | L2 | | L3 | | L0 | | L1 | | L2 | | L3 | |
| | | CS | OCC | CS | OCC | CS | OCC | CS | OCC | CS | OCC | CS | OCC | CS | OCC | CS | OCC |
| 000 | 0 | 0 | + | 6 | + | 3 | + | 9 | + | 0 | + | 6 | + | 3 | − | 9 | − |
| 001 | 6 | 6 | + | 0 | + | 9 | + | 3 | + | 6 | + | 0 | + | 9 | − | 3 | − |
| 010 | 3 | 3 | + | 9 | + | 6 | + | 0 | + | 3 | + | 9 | + | 6 | − | 0 | − |
| 011 | 4 | 4 | + | 10 | + | 7 | + | 1 | + | 4 | + | 10 | + | 7 | − | 1 | − |
| 100 | 2 | 2 | + | 8 | + | 5 | + | 11 | + | 2 | + | 8 | + | 5 | − | 11 | − |
| 101 | 8 | 8 | + | 2 | + | 11 | + | 5 | + | 8 | + | 2 | + | 11 | − | 5 | − |
| 110 | 10 | 10 | + | 4 | + | 1 | + | 7 | + | 10 | + | 4 | + | 1 | − | 7 | − |
| 111 | 9 | 9 | + | 3 | + | 0 | + | 6 | + | 9 | + | 3 | + | 0 | − | 6 | − |

Referring to Table 18, nDMRS(2) is transmitted according to a value of a cyclic shift field of a DCI format, and thus a value of a cyclic shift value of a reference signal of each layer and an OCC applied to each layer can be determined. An interval of cyclic shift values of reference signals between 1st and 2nd layers and an interval of cyclic shift values of reference signals between 3rd and 4th layers are maximized. OCCs with different signs are applied to a cyclic shift value having a narrow interval. Accordingly, an OCC with a minus sign (−) is applied to a 2nd slot (i.e., slot 1) with respect to a 3rd layer (L2) and a 4th layer (L3). If the number of layers is less than or equal to 4, only a value corresponding to some layers can be used among the OCC and the cyclic shift value of Table 18. That is, if the number of layers is 2, only a value corresponding to L0 and L1 can be used, and if the number of layers is 3, values corresponding to L0 to L2 can be used. If the number of layers is 2, not only L0 and L1 but also any two layers can be selected. In addition, a value corresponding to L0 to L3 in Table 18 can be permutated for each column.

With respect to the OCC and the cyclic shift value allocated to each layer defined in Table 18, an additional OCC can be applied for a MU-MIMO system. This is to minimize interference between respective UEs.

Table 19 shows another example of a cyclic shift field in a DCI format, a cyclic shift value allocated to each layer, and an OCC.

layer. That is, OCCs with signs {+,−,+,−,+,−,+,−} are applied sequentially to cyclic shift values {0,2,3,4,6,8,9,10} in a 1st layer (L0). A cyclic shift value and an OCC index can be allocated to have an effect in which an interval of each cyclic shift value is maximized between UEs performing MU-MIMO transmission. That is, when different UEs have the closest cyclic shift values and timing of receiving respective transmitted signals is misaligned, there may be an effect in which the same cyclic shift value is received. Therefore, by allocating different OCC indices to the closest cyclic shift values to have an effect in which an interval of cyclic shift values between corresponding UEs is maximized, it is possible to solve a problem occurring when cyclic shift values are allocated to have a close interval between UEs in MU-MIMO. Accordingly, interference between respective layers can be minimized in a MU-MIMO system in which a plurality of UEs exist. When a sign of an OCC applied to each cyclic shift value is determined in a 1st layer (L0), according to the determined sign, a sign of an OCC applied to the remaining layers can be determined. A sign of an OCC applied to a 2nd layer (L1) may have the same sign of the OCC applied to the 1st layer, and a sign of an OCC applied to a 3rd layer (L2) and a 4th layer (L3) may have an opposite sign of the OCC applied to the 1st layer. Alternatively, in case of rank-2 transmission, a sign of the OCC applied to the 1st layer and a sign of the OCC applied to the 2nd layer may be opposite to each other.

TABLE 19

| Cyclic Shift Field | $n_{DMRS}^{(2)}$ | Slot0 | | | | | | | | Slot1 | | | | | | | |
|---|---|---|---|---|---|---|---|---|---|---|---|---|---|---|---|---|---|
| | | L0 | | L1 | | L2 | | L3 | | L0 | | L1 | | L2 | | L3 | |
| | | CS | OCC | CS | OCC | CS | OCC | CS | OCC | CS | OCC | CS | OCC | CS | OCC | CS | OCC |
| 000 | 0 | 0 | + | 6 | + | 3 | + | 9 | + | 0 | + | 6 | + | 3 | − | 9 | − |
| 001 | 6 | 6 | + | 0 | + | 9 | + | 3 | + | 6 | + | 0 | + | 9 | − | 3 | − |
| 010 | 3 | 3 | + | 9 | + | 6 | + | 0 | + | 3 | + | 9 | + | 6 | − | 0 | − |
| 011 | 4 | 4 | + | 10 | + | 7 | + | 1 | + | 4 | − | 10 | − | 7 | + | 1 | + |
| 100 | 2 | 2 | + | 8 | + | 5 | + | 11 | + | 2 | − | 8 | − | 5 | + | 11 | + |
| 101 | 8 | 8 | + | 2 | + | 11 | + | 5 | + | 8 | − | 2 | − | 11 | + | 5 | + |
| 110 | 10 | 10 | + | 4 | + | 1 | + | 7 | + | 10 | − | 4 | − | 1 | + | 7 | + |
| 111 | 9 | 9 | + | 3 | + | 0 | + | 6 | + | 9 | + | 3 | + | 0 | − | 6 | − |

Referring to Table 19, nDMRS(2) is transmitted according to a value of a cyclic shift field of a DCI format, and thus a value of a cyclic shift value of a reference signal of each layer and an OCC applied to each layer can be determined. An interval of cyclic shift values of reference signals between 1st and 2nd layers and an interval of cyclic shift values of reference signals between 3rd and 4th layers are maximized.

In addition, when applying an OCC, instead of applying an OCC with the same sign to one layer, OCCs with different signs are applied between adjacent cyclic shift values in a Accordingly, interference between respective layers in the UE can be minimized in a MU-MIMO or SU-MIMO environment.

If the number of layers is less than or equal to 4 in Table 19, only a value corresponding to some layers can be used among the OCC and the cyclic shift value of Table 19. That is, only values corresponding to L0 and L1 can be used if the number of layers is 2, and values corresponding to L0 to L2 can be used if the number of layers is 3. If the number of layers is 2, not only L0 and L1 but also any two layers can be selected. In addition, a value corresponding to L0 to L3 in Table 19 can be permutated for each column.

A sign of an OCC applied to each layer and a cyclic shift value of each layer can be determined variously. A corresponding OCC index can be determined according to a cyclic shift field in a DCI format. According to the OCC index, a sign of an OCC depending on a cyclic shift value can be determined.

Table 20 shows an example of a mapping relation of an OCC index and a cyclic shift field in a DCI format.

TABLE 20

| Cyclic Shift Field in DCI format 0 | $n_{DMRS}^{(2)}$ | $n_{DMRS}^{OCC}$ case 1 | $n_{DMRS}^{OCC}$ case 2 | $n_{DMRS}^{OCC}$ case 3 | $n_{DMRS}^{OCC}$ case 4 | $n_{DMRS}^{OCC}$ case 5 | $n_{DMRS}^{OCC}$ case 6 |
|---|---|---|---|---|---|---|---|
| 000 | 0 | 0 | 0 | 0 | 0 | 0 | 0 |
| 001 | 6 | 0 | 0 | 0 | 0 | 1 | 1 |
| 010 | 3 | 1 | 1 | 1 | 1 | 1 | 1 |
| 011 | 4 | 1 | 1 | 0 | 0 | 0 | 0 |
| 100 | 2 | 0 | 0 | 0 | 0 | 1 | 1 |
| 101 | 8 | 0 | 0 | 1 | 1 | 0 | 0 |
| 110 | 10 | 1 | 1 | 1 | 1 | 1 | 1 |
| 111 | 9 | 1 | 1 | 1 | 1 | 0 | 0 |
| ? | 1 | 1 | 0 | 0 | 1 | 0 | 1 |
| ? | 5 | 0 | 1 | 1 | 0 | 1 | 0 |
| ? | 7 | 1 | 0 | 0 | 1 | 0 | 1 |
| ? | 11 | 0 | 1 | 1 | 0 | 1 | 0 |

Referring to Table 20, if a cyclic shift value nDMRS(2) corresponding to each cyclic shift field exists, an OCC index corresponds to each cyclic shift value. In Table 20, when the OCC index is 0, it may imply that an OCC applied to 1st and 2nd slots is [1 1], and when the OCC is 1, it implies that an OCC applied to the 1st and 2nd slots is [1 −1]. Alternatively, the opposite is also applicable. Taking the case 1 of Table 20 for example, when cyclic shift values are 0, 2, 6, and 8, [1 1] is applied as the OCC, and when cyclic shift values are 3, 4, 9, and 10, [1 −1] is applied as the OCC. In addition to 8 cyclic shift values defined in 3GPP LTE rel-8, four additional cyclic shift values and cyclic shift values corresponding thereto can be taken into consideration.

Table 21 shows another example of a mapping relation of an OCC index and a cyclic shift field in a DCI format.

TABLE 21

| Cyclic Shift Field in DCI format 0 | $n_{DMRS}^{(2)}$ | $n_{DMRS}^{OCC}$ case 7 | $n_{DMRS}^{OCC}$ case 8 | $n_{DMRS}^{OCC}$ case 9 | $n_{DMRS}^{OCC}$ case 10 | $n_{DMRS}^{OCC}$ case 11 | $n_{DMRS}^{OCC}$ case 12 |
|---|---|---|---|---|---|---|---|
| 000 | 0 | 0 | 0 | 0 | 0 | 0 | 0 |
| 001 | 6 | 0 | 0 | 0 | 0 | 0 | 0 |
| 010 | 3 | 0 | 0 | 0 | 0 | 0 | 0 |
| 011 | 4 | 1 | 1 | 1 | 1 | 1 | 1 |
| 100 | 2 | 1 | 1 | 1 | 1 | 1 | 1 |
| 101 | 8 | 1 | 1 | 1 | 1 | 1 | 1 |
| 110 | 10 | 1 | 1 | 1 | 1 | 1 | 1 |
| 111 | 9 | 0 | 0 | 0 | 0 | 0 | 0 |
| ? | 1 | 1 | 0 | 0 | 1 | 1 | 0 |
| ? | 5 | 1 | 0 | 1 | 0 | 1 | 0 |
| ? | 7 | 1 | 0 | 0 | 1 | 0 | 1 |
| ? | 11 | 1 | 0 | 1 | 0 | 0 | 1 |

Figure 13:
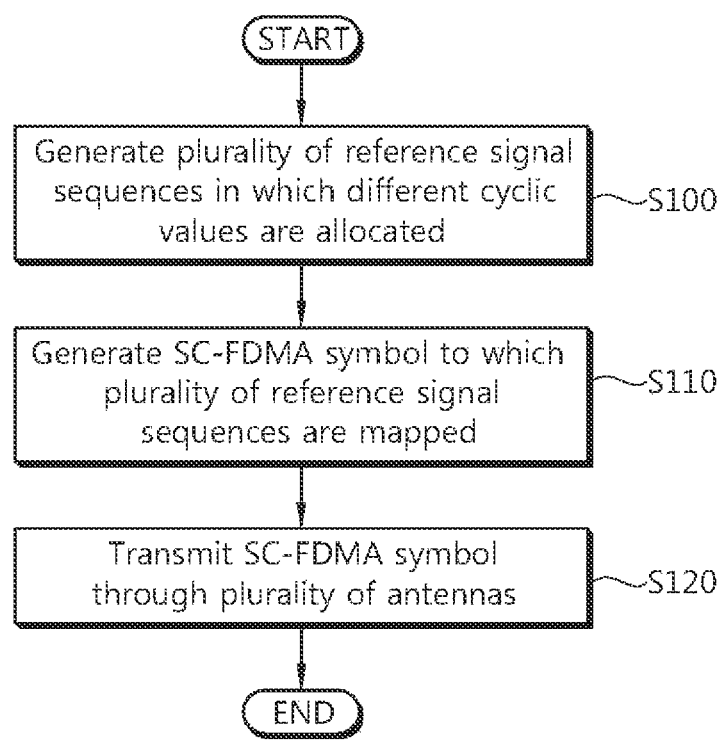
FIG. 13 is a block diagram showing an embodiment of the proposed reference signal transmission method.

FIG. 13 is a flowchart showing an embodiment of the proposed reference signal transmission method.

In step S100, a UE generates a plurality of reference signal sequences in which different cyclic shift values are allocated respectively to a plurality of layers. In step S110, the UE generates an SC-FDMA symbol to which the plurality of reference signal sequences are mapped. In step S120, the UE transmits the SC-FDMA symbol to a BS through a plurality of antennas. Each of the reference signal sequences can be multiplied by either +1 or −1 in accordance with an OCC index corresponding to a cyclic shift field in a DCI format transmitted through a PDCCH for each layer.

Figure 14:
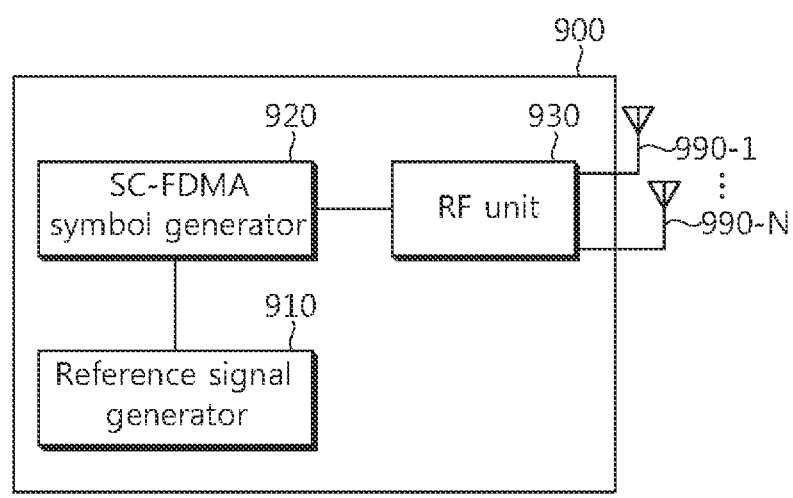
FIG. 14 is a block diagram of a UE according to an embodiment of the present invention.

FIG. 14 is a block diagram of a UE according to an embodiment of the present invention.

A UE 900 includes a reference signal generator 910, an SC-FDMA symbol generator 920, and a radio frequency (RF) unit 930. The reference signal generator 910 generates a plurality of reference signal sequences in which different cyclic shift values are allocated respectively to a plurality of layers. The SC-FDMA symbol generator 920 is connected to the reference signal generator and generates an SC-FDMA symbol to which the plurality of reference signal sequences are mapped. The RF unit 930 is connected to the SC-FDMA symbol generator and transmits the SC-FDMA symbol to a BS through a plurality of antennas.

The exemplary embodiments of the present invention may be implemented by hardware, software, or a combination thereof. The hardware may be implemented by an application specific integrated circuit (ASIC), digital signal processing (DSP), a programmable logic device (PLD), a field programmable gate array (FPGA), a processor, a controller, a microprocessor, other electronic units, or a combination thereof, all of which are designed so as to perform the above-mentioned functions. The software may be implemented by a module performing the above-mentioned functions. The software may be stored in a memory unit and may be executed by a processor. The memory unit or a processor may adopt various units well-known to those skilled in the art.

In the above-mentioned exemplary embodiments, the methods are described based on the series of steps or the flow charts shown by a block, but the exemplary embodiments of the present invention are not limited to the order of the steps and any steps may be performed in order different from the above-mentioned steps or simultaneously. In addition, a person skilled in the art to which the present invention pertains may understand that steps shown in the flow chart are not exclusive and thus, may include other steps or one or more step of the flow chart may be deleted without affecting the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belonging to the following claims.

What is claimed is:

1. A method for transmitting, by a user equipment (UE), a demodulation reference signal (DMRS) for a physical uplink shared channel (PUSCH) in a wireless communication system, the method comprising:
    receiving a cyclic shift field through a physical downlink control channel (PDCCH) from a base station,
    wherein the cyclic shift field indicates first, second, third and fourth cyclic shifts, a first orthogonal cover code (OCC) and a second OCC;
    generating a first DMRS sequence, which is associated with a first layer, by using the first cyclic shift and the first OCC;
    generating a second DMRS sequence, which is associated with a second layer, by using the second cyclic shift and the first OCC;
    generating a third DMRS sequence, which is associated with a third layer, by using the third cyclic shift and the second OCC;
    generating a fourth DMRS sequence, which is associated with a fourth layer, by using the fourth cyclic shift and the second OCC; and
    transmitting the first, second, third and fourth DMRS sequences to the base station.

2. The method of claim 1, wherein the first OCC and the second OCC are different from each other.

3. The method of claim 2, wherein the first OCC is [1 1] and the second OCC is [1 −1].

4. The method of claim 2, wherein the first OCC is [1 −1] and the second OCC is [1 1].

5. The method of claim 1, wherein the first OCC and second OCC are same.

6. The method of claim 1, wherein the cyclic shift field has a length of 3 bits.

7. The method of claim 1, wherein the cyclic shift field is received via a downlink control information (DCI) format.

8. The method of claim 1, wherein the first cyclic shift and the second cyclic shift have a maximum interval.

9. The method of claim 1, wherein the third cyclic shift and the fourth cyclic shift have a maximum interval.

10. A user equipment (UE) configured to transmit a demodulation reference signal (DMRS) for a physical uplink shared channel (PUSCH) in a wireless communication, the UE comprising:
    a radio frequency (RF) unit configured to transmit or receive a radio signal, and
    a processor coupled to the RF unit, and configured to:
    receive a cyclic shift field through a physical downlink control channel (PDCCH) from a base station,
    wherein the cyclic shift field indicates first, second, third and fourth cyclic shifts, a first orthogonal cover code (OCC) and a second OCC;
    generate a first DMRS sequence, which is associated with a first layer, by using the first cyclic shift and the first OCC;
    generate a second DMRS sequence, which is associated with a second layer, by using the second cyclic shift and the first OCC;
    generate a third DMRS sequence, which is associated with a third layer, by using the third cyclic shift and the second OCC;
    generate a fourth DMRS sequence, which is associated with a fourth layer, by using the fourth cyclic shift and the second OCC; and
    transmit the first, second, third and fourth DMRS sequences to the base station.

11. The UE of claim 10, wherein the first OCC and the second OCC are different from each other.

12. The UE of claim 11, wherein the first OCC is [1 1] and the second OCC is [1 −1].

13. The UE of claim 11, wherein the first OCC is [1 +1] and the second OCC is [1 1].

14. The UE of claim 10, wherein the first OCC and the second OCC are same.

15. The UE of claim 10, wherein the cyclic shift field has a length of 3 bits.

16. The UE of claim 10, wherein the cyclic shift field is received via a downlink control information (DCI) format.

17. The UE of claim 10, wherein the first cyclic shift and the second cyclic shift have a maximum interval.

18. The UE of claim 10, wherein the third cyclic shift and the fourth cyclic shift have a maximum interval.

* * * * *